US000001281H

United States Statutory Invention Registration [19]

[11] Reg. Number: H1281

[43] Published: * Jan. 4, 1994

Hirabayashi et al.

[54] HIGH-CONTRAST SILVER HALIDE PHOTOGRAPHIC MATERIAL

[75] Inventors: Kazuhiko Hirabayashi; Takeshi Sampei; Yoji Hara; Miho Sai, all of Hino, Japan

[73] Assignee: Konica Corporation, Tokyo, Japan

[ * ] Notice: The portion of the term of this patent subsequent to Dec. 11, 2007 has been disclaimed.

[21] Appl. No.: 475,966

[22] Filed: Feb. 6, 1990

[30] Foreign Application Priority Data

Feb. 7, 1989 [JP] Japan ..... 1-29385

[51] Int. Cl.[5] ..... G03C 1/06

[52] U.S. Cl. ..... 430/264; 430/441

[58] Field of Search ..... 430/264, 441, 442, 598, 430/602, 607, 265, 621, 622, 626

[56] References Cited

U.S. PATENT DOCUMENTS

| | | | |
|---|---|---|---|
| 3,128,183 | 4/1964 | Jones et al. | 96/107 |
| 4,221,857 | 9/1980 | Okutsu et al. | 430/264 |
| 4,243,739 | 1/1981 | Mifune et al. | 430/266 |
| 4,385,108 | 5/1983 | Takagi et al. | 430/264 |
| 4,686,167 | 8/1987 | Resnick et al. | 430/264 |
| 4,816,373 | 3/1989 | Ohashi et al. | 430/264 |
| 4,874,687 | 10/1989 | Itabashi | 430/446 |
| 4,914,002 | 4/1990 | Inoue et al. | 430/264 |
| 4,977,063 | 12/1990 | Usagawa et al. | 430/264 |
| 4,978,602 | 12/1990 | Fujita et al. | 430/264 |
| 4,988,603 | 1/1991 | Takamuki et al. | 430/264 |

FOREIGN PATENT DOCUMENTS

| | | | |
|---|---|---|---|
| 303789 | 2/1989 | European Pat. Off. | 430/626 |

*Primary Examiner*—Robert L. Stoll
*Assistant Examiner*—Joseph D. Anthony
*Attorney, Agent, or Firm*—Finnegan, Henderson, Farabow, Garrett & Dunner

[57] ABSTRACT

The improve silver halide photographic material contains a specified hydrazide compound and a specified polyoxyethylene based compound and is capable of providing high-contrast image with high sensitivity in a rapid and consistent way.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH-CONTRAST SILVER HALIDE PHOTOGRAPHIC MATERIAL

BACKGROUND OF THE INVENTION

The present invention relates to a silver halide photographic material. More particularly, the present invention relates to a silver halide photographic material capable of providing a high-contrast and sensitivity photographic image in a rapid and consistent way.

High-contrast photographic image is usually employed in forming characters or halftone image in photomechanical processes, or forming fine-line image in ultra-high-precision photomechanical processes. Certain kinds of silver halide photographic materials are known to be capable of forming photographic image with very high contrast. In one conventional method, a light-sensitive material composed of a silver chlorobromide emulsion that has an average grain size of 0.2 μm, that has a narrow grain size distribution, that comprises uniformly shaped grains and that has a high silver chloride content (at least 50 mol %) is processed with an alkaline hydroquinone developer of low sulfite ion concentration to form an image of high sharpness and high resolution, for example, a halftone image or a fine-line image. Silver halide light-sensitive materials of a type to be processed by this method are known as "lithographic" light-sensitive materials.

The photomechanical process involves a step of converting the original of continuous tone to be reproduced into a halftone image, or a step in which the continuous change in the density of the original is converted to a set of dots having areas proportional to the varying densities. To form a halftone image, the original is imaged onto a "lithographic" light-sensitive material via a crossline screen or a contact screen and subsequently developed. However, development of a lith-type light-sensitive material (i.e., a silver halide photographic material containing a silver halide emulsion consisting of fine grains of uniform size and shape) with an ordinary black-and-white developer results in the formation of a lower quality image than when it is developed with a lith-type developer. Thus, the lith-type light-sensitive material is conventionally processed with a lith-type developer that has a very low concentration of sulfite ions and which contains hydroquinone as the sole developing agent. However, developers of the lith type are very low in storage stability because they are highly sensitive to autooxidation. Hence, there is a strong need for controlling them to provide consistent quality of development in their continuous use and substantial efforts have been made to improve the storage stability of lith-type developers.

One of the methods proposed so far to attain object is replenishment with two separate liquids, one being a replenisher intended to compensate for the deterioration in developer's activity during development (compensation for process fatigue) and the other being a replenisher intended to compensate for the oxidative deterioration over time (compensation for aging fatigue). This method of using two types of replenishers is commonly adopted with automatic processors in photomechanical processes. However, because of the need to control the balance in replenishment with two liquids, this method suffers the problem of complexity in both equipment and operations.

Another problem with the use of lith-type developers is that they have a long induction period (i.e., the time required for an image to appear upon development) and hence are incapable of providing rapid access to image.

Methods are known that are capable of rapid formation of high-contrast image without using developers of the lith type. They are characterized by containing hydrazine compounds in silver halide light-sensitive materials [see U.S. Pat. No. 2,419,975 and JP-A-51-16623 (the term "JP-A" as used herein means an "unexamined published Japanese patent application"), JP-A-51-20921, etc.]. According to these methods, the concentration of sulfite ions in developers can be held high enough to accomplish development with their storage stability being maintained at enhanced levels. However, in order to obtain a contrasty image by these methods, a developer with fairly high pH is necessary, which presents a problem in keeping the developer stable to produce a photographic image rapidly and with high sensitivity. The high pH of the developer tends to cause fogging and to prevent it, various organic restrainers must be contained in high concentrations but then sensitivity is compromised. A further problem is that a contrasty image is susceptible to defects such as pinholes if dust particles or other foreign substances are deposited on the light-sensitive material.

SUMMARY OF THE INVENTION

A first object, therefore, of the present invention is to provide a silver halide photographic material that is capable of producing a contrasty image in a rapid and consistent way.

A second object of the present invention is to provide a silver halide photographic material that is capable of consistent production of a contrasty image with minimum loss in sensitivity.

A third object of the present invention is to provide a silver halide photographic image capable of producing a contrasty and low-fog image.

A fourth object of the present invention is to provide a silver halide photographic image capable of producing a contrasty halftone image of high quality.

These and other objects of the present invention will become apparent by reading the following description.

The above-described objects of the present invention can be attained by a silver halide photographic material having at least one light-sensitive silver halide emulsion layer and which contains at least one of the compounds represented by the general formulas (I), (II) and (III) shown below and at least one compound represented by the general formula (IV) also shown below:

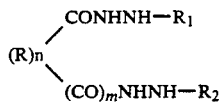

(I)

(where $R_1$ and $R_2$ each represents an aryl group or a heterocyclic group; R is an organic linkage; n is 0–6; and m is 0 or 1, provided that when n is 2 or more, R may be the same or different);

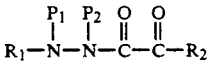

(II)

(where $R_1$ is an aliphatic, aromatic or heterocyclic group; $R_2$ is a hydrogen atom or an optionally substituted alkoxy, heterocyclicoxy, amino or aryloxy group;

$P_1$ and $P_2$ each represents a hydrogen atom, an acyl group or a sulfinic acid group);

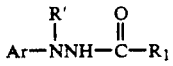

(III)

(where Ar is an aryl group containing at least one of a non-diffusible group; or a silver halide adsorption accelerating group; $R_1$ is an optionally substituted alkyl, alkoxy or amino group; R' is a hydrogen atom or a substituent);

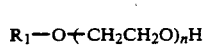

(IV)

(where $R_1$ is a hydrogen atom or a substituted or unsubstituted aromatic group; n is an integer of 10–200).

DETAILED DESCRIPTION OF THE INVENTION

The specific construction of the present invention is described hereinafter in detail.

First, the compounds represented by the general formulas (I), (II) and (III) are specifically described below.

General formula (I) is as follows:

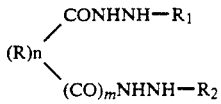

(I)

where $R_1$ and $R_2$ each represents an aryl group or a heterocyclic group; R is a divalent organic group; n is 0–m 6; and m is 0 or 1.

Examples of the aryl group represented by $R_1$ and $R_2$ include phenyl, naphthyl, etc. Examples of the heterocyclic group represented by $R_1$ and $R_2$ include pyridyl, benzothiazolyl, quinolyl, thienyl, etc. A preferred example of $R_1$ and $R_2$ is an aryl group. Various substituents can be introduced into the aryl or heterocyclic group represented by $R_1$ and $R_2$. Exemplary substituents include a halogen atom (e.g. chlorine or fluorine), an alkyl group (e.g. methyl, ethyl or dodecyl), an alkoxy group (e.g. methoxy, ethoxy, isopropoxy, butoxy, octyloxy or dodecyloxy), an acylamino group [e.g. acetylamino, pivalylamino, benzoylamino, tetradecanoylamino or a-(2,4-di-t-amylphenoxy) butyrylamin], a sulfonylamino group (e.g. methanesulfonylamino, butan ulfonylamino, dodecanesulfonylamino or benzenesulfonylamino), a urea group (e.g. phenylurea or ethylurea), a thiourea group (e.g. phenylthiourea or ethylthiourea), a hydroxy group, an amino group an alkylamino group (e.g. methylamino or dimethylamino), a carboxyl group, an alkoxycarbonyl group (e.g. ethoxycarbonyl), a carbamoyl group and a sulfo group. Examples of the divalent organic group represented by R include an alkylene group (e.g. methylene, ethylene, trimethylene and tetramethylene), an arylene group (e.g. phenylene and naphthylene), and an aralkylene group. The alkylene group may contain in the bond an oxy a thio group, a seleno group, a carbonyl group, group

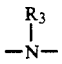

(where $R_3$ is a hydrogen atom, an alkyl group or an aryl group), a sulfonyl group, etc. Various substituents may be introduced into the group represented by R. Exemplary substituents include —CONHNHR$_4$ ($R_4$ has the same meaning as $R_1$ and $R_2$ described above)r an alkyl group, an alkoxy group, a halogen atom, a hydroxy group, a carboxyl group, an acyl group, an aryl group, etc. A preferred example of R is an alkylene group.

Preferred examples of the compound represented by the general formula (I) are those wherein $R_1$ and $R_2$ are each a substituted or unsubstituted phenyl group, n=m=1 and R is an alkylene group.

The following are typical examples of the compound represented by the general formula (I):

I-1

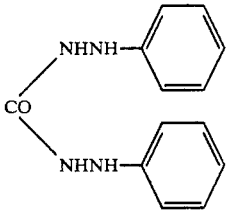

I-2

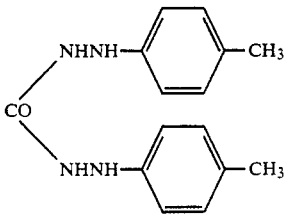

-continued
I-3
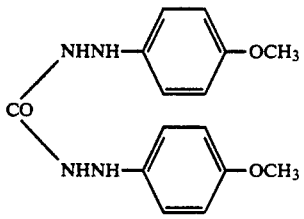
I-4
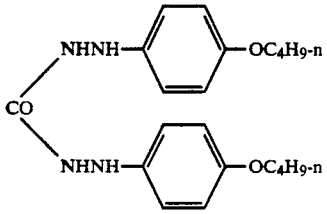
I-5
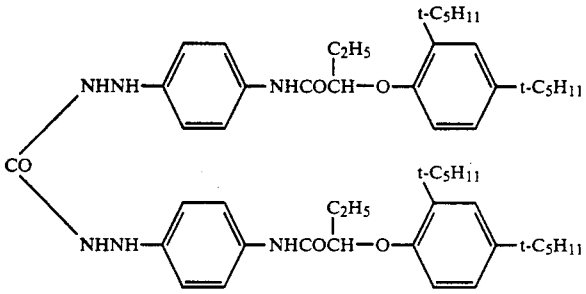
I-6
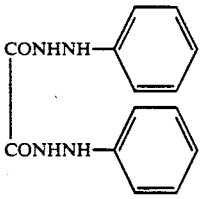
I-7
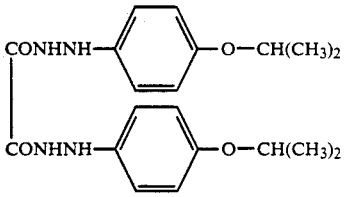
I-8
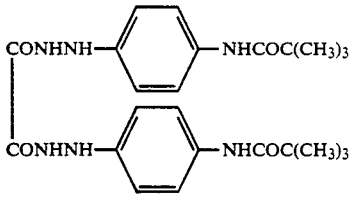
I-9
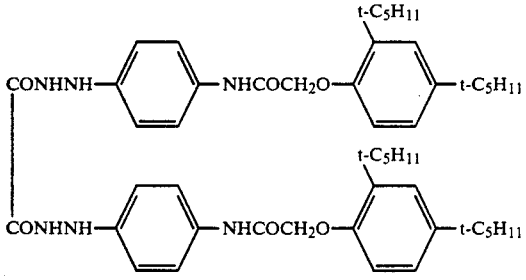

-continued
I-10
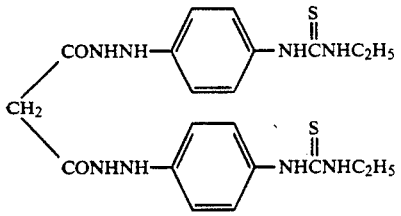
I-11
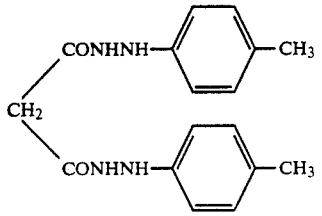
I-12
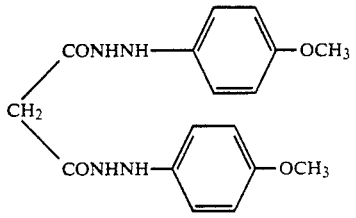
I-13
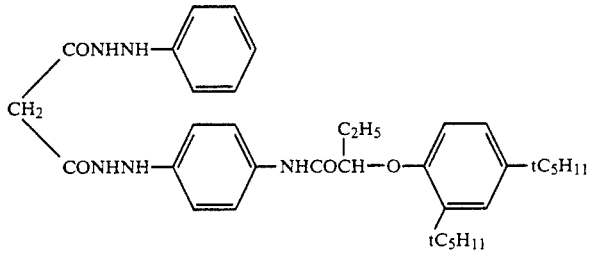
I-14
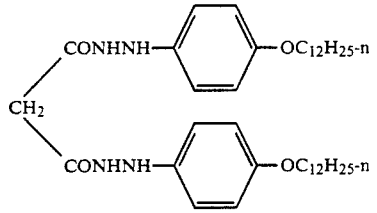
I-15
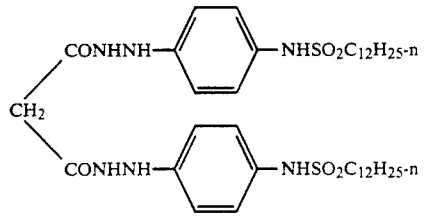

-continued
I-16
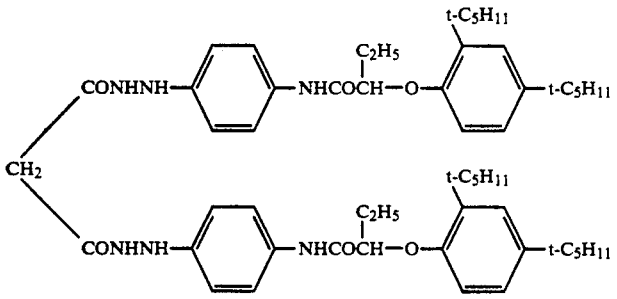
I-17
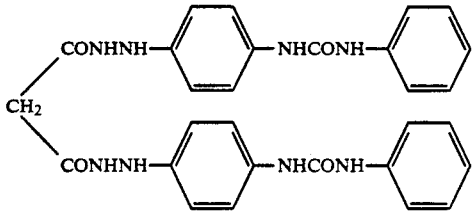
1-18
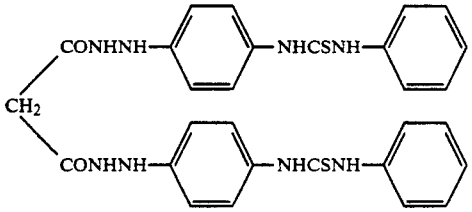
I-19
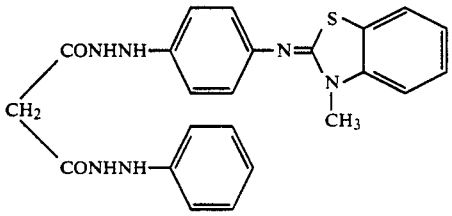
I-20
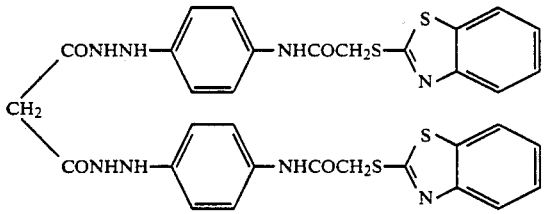
I-21
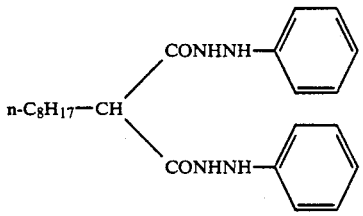
I-22
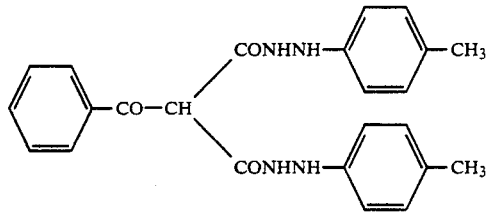

-continued
I-23
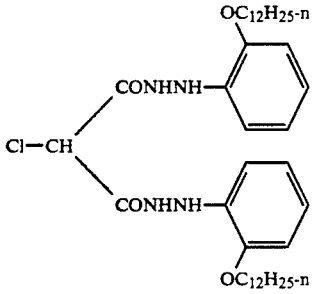
I-24
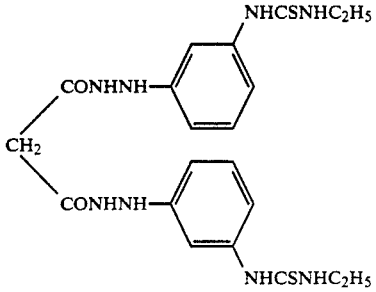
I-25
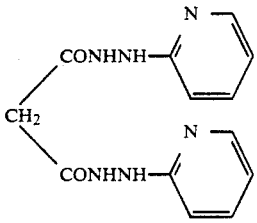
I-26
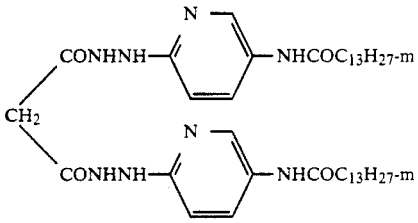
I-27
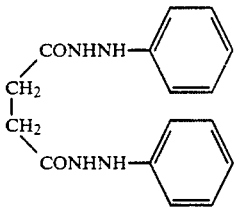
I-28
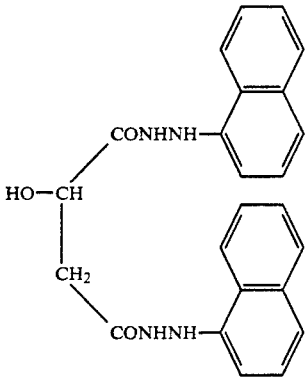

-continued
I-29
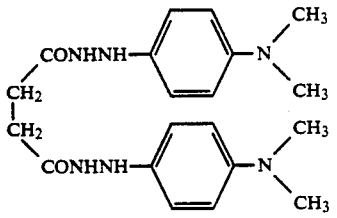
I-30
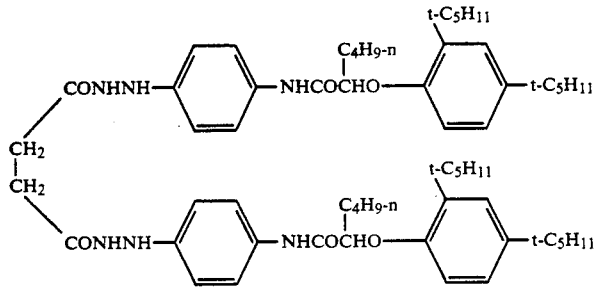
I-31
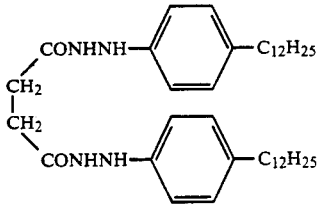
I-32
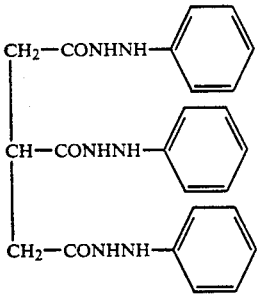
I-33
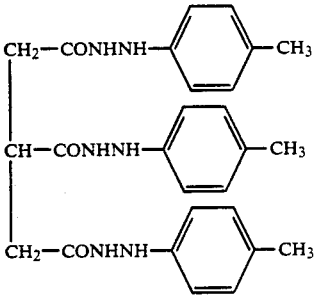

-continued
I-34
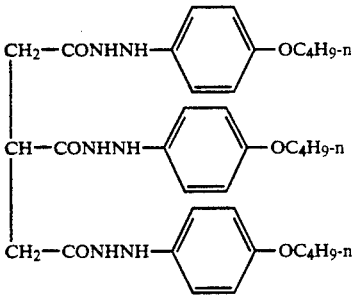
I-35
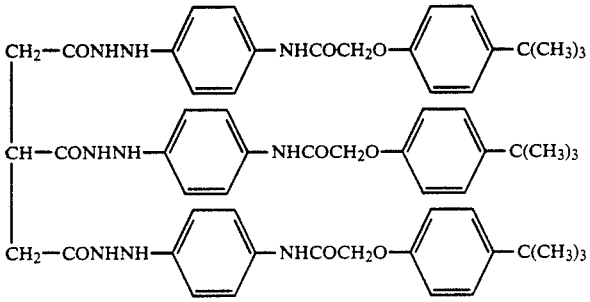
I-36
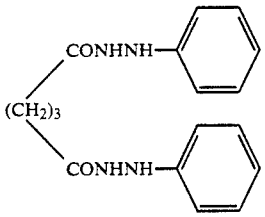
I-37
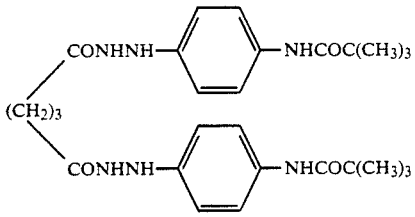
I-38
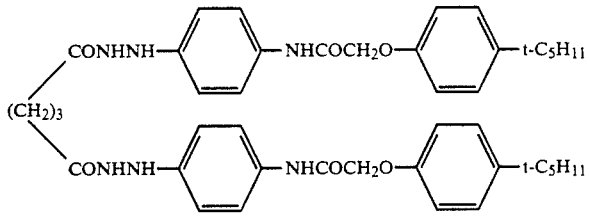
I-39
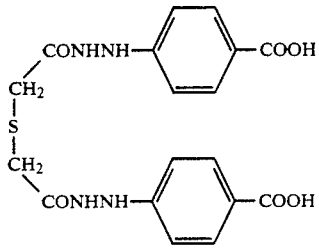

-continued
I-40
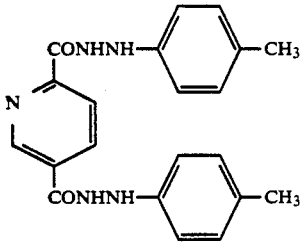
I-41
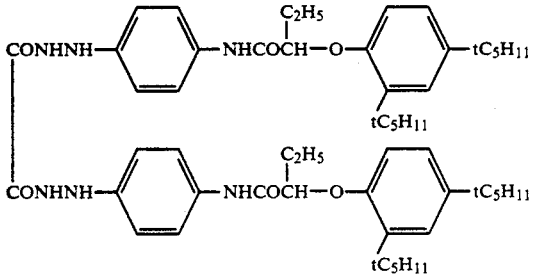
I-42
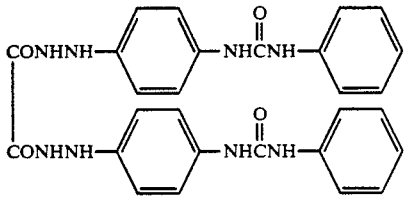
I-43
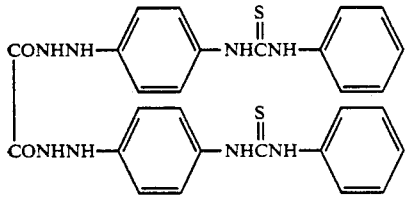
I-44
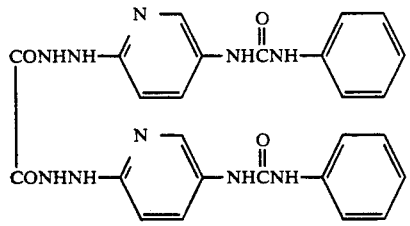
I-45
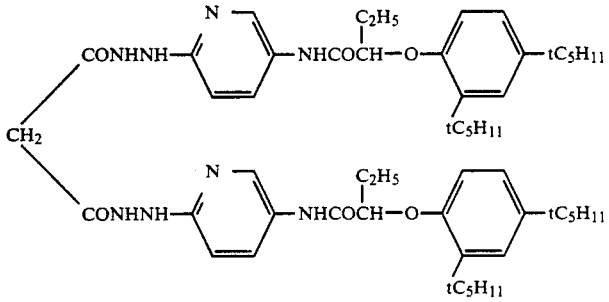

-continued
1-46
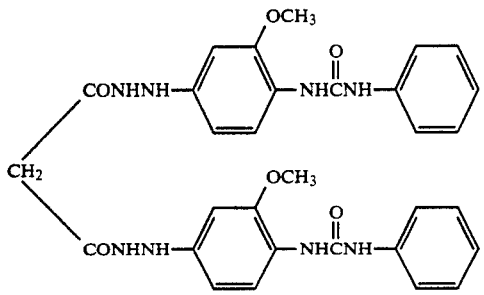
I-47
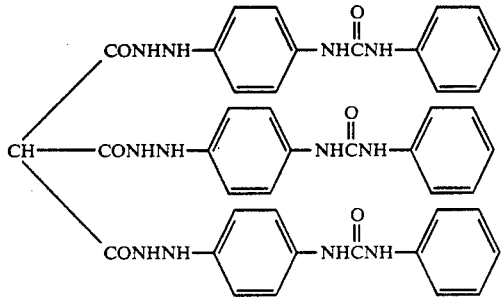
I-48
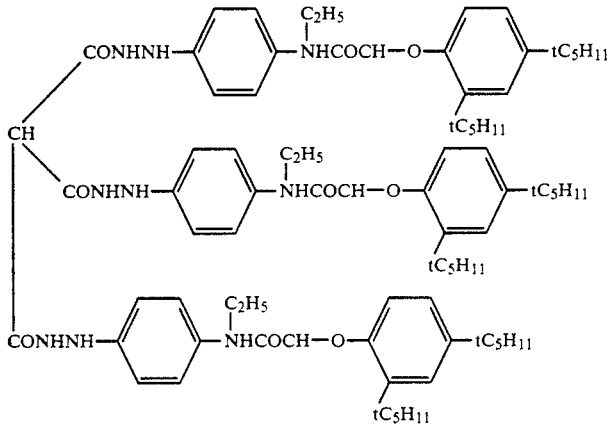
I-49
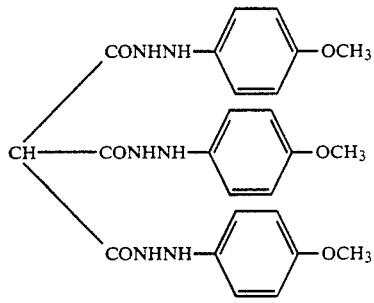
I-50
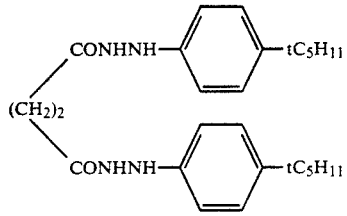

-continued

I-51

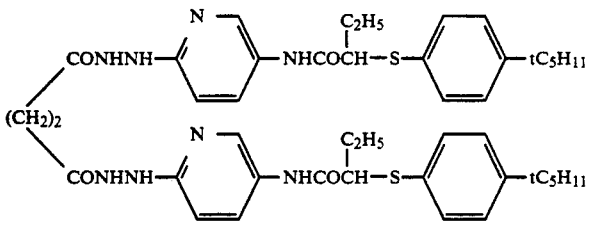

I-52

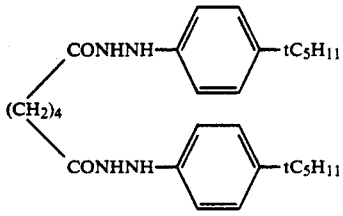

I-53

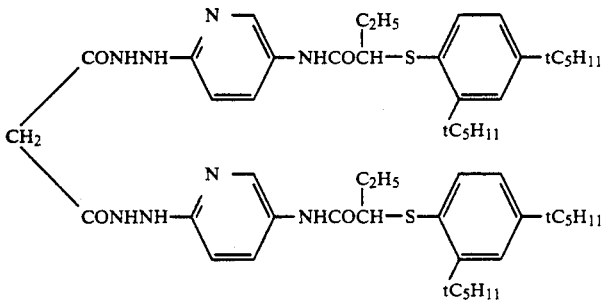

I-54

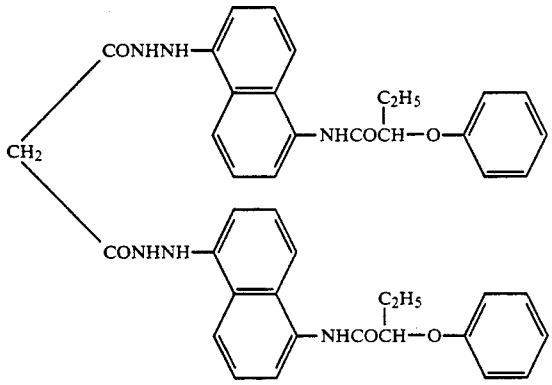

I-55

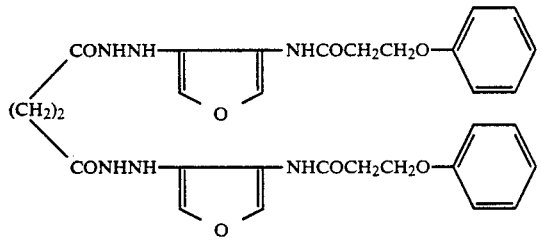

The general formula (II) is as follows:

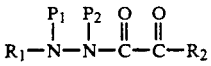

(II)

where $R_1$ is an aliphatic, aromatic or heterocyclic group; $R_2$ is a hydrogen atom or an optionally substituted alkoxy, heterocyclicoxy, amino or aryloxy group; $P_1$ and $P_2$ each represents a hydrogen atom, an acyl group or a sulfinic acid group.

The aliphatic group represented by $R_1$ is preferably one having at least 6 carbon atoms, with a straight-chained, branched or cyclic alkyl group having 8–50 carbon atoms being particularly preferred. The branched alkyl group may be cyclized to form a saturated hetero ring containing one or more hetero atoms. The alkyl group represented by R, may contain a substituent such as an aryl, alkoxy or sulfoxy group.

The aromatic group represented by $R_1$ is a monocyclic or bicyclic aryl group or an unsaturated heterocyclic group, which may be condensed with a mono- or bicyclic aryl group to form a hetero aryl group. Examples of the aromatic group represented by $R_1$ included those which contain a benzene ring, a naphthalene ring, a pyridine ring, a pyrimidine ring, an imidazole ring, a pyrazole ring, a quinoline ring, an isoquinoline ring, a benzimidazole ring, a thiazole ring, a benzothiazole ring, etc. and an aromatic group containing a benzene ring is particularly preferred. A particularly preferred example of $R_1$ is an aryl group.

The aryl group or unsaturated heterocyclic group represented by $R_1$ may be substituted and typical substituents include, for example, a straight-chained, branched or cyclic alkyl group (preferably one in which the alkyl portion is mono- or bicyclic with 1-20 carbon atoms), an alkoxy group (preferably one having 1-20 carbon atoms), a substituted amino group (preferably one which is substituted with an alkyl group having 1-20 carbon atoms), an acylamino group (preferably one having 2-30 carbon atoms), a sulfonamido group (preferably one having 1-30 carbon atoms) and a ureido group (preferably one having 1-30 carbon atoms).

The optionally substituted alkoxy group represented by $R_2$ in the general formula (II) is one having 1-20 carbon atoms which may have a substituent such as a halogen atom or an aryl group.

The optionally substituted aryloxy or heterocyclic oxy group which is represented by $R_2$ in the general formula (II) is preferably monocyclic and exemplary substituents include a halogen atom, an alkyl group, an alkoxy group, a cyano group, etc.

A preferred example of the group represented by $R_2$ is an optionally substituted alkoxy or amino group. In the case of an amino group, it is group

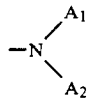

where $A_1$ and $A_2$ are each an optionally substituted alkyl or alkoxy group, or they may combine to form a cyclic structure containing an —O—, —S— or —N— bond. It should however be noted that $R_2$ is in no case a hydrazino group.

A ballast group commonly employed in couplers and other immobilized photographic additives may be incorporated into $R_1$ or $R_2$ in the general formula (II). A ballast group is a group having at least 8 carbon atoms which is fairly innert to photographic properties and may be selected from among, for example, an alkyl group, an alkoxy group, a phenyl group, an alkylphenyl group, a phenoxy group, an alkylphenoxy group, an amino group, an amido group and an ureido group.

A group that enhances adsorption onto the surface of silver halide grains may be incorporated into $R_1$ or $R_2$ in the general formula (II). Examples of such adsorption enhancing group include those which are described in U.S. Pat. No. 4,355,105 such as a thiourea group, a heterocyclic thioamido group, a mercapto heterocyclic group and a triazole group. Among the compounds represented by the general formula (II), those which are represented by the following general formula (IIa) are particularly preferred:

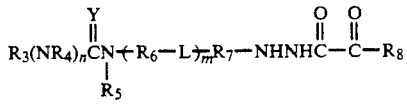

(IIa)

where $R_3$ and $R_4$ each represents a hydrogen atom, an optionally substituted alkyl group (e.g. methyl, ethyl, butyl, dodecyl, 2-hydroxypropyl, 2-cyanoethyl or 2-chloroethyl), or an optionally substituted phenyl, naphthyl, cyclohexyl, pyridyl or pyrrolidyl group (e.g. phenyl, p-methylphenyl, naphthyl, a-hydroxynaphthyl, cyclohexyl, p-methylcyclohexyl, pyridyl, 4-propyl-2-pyridyl, pyrrolidyl or 4-methyl-2-pyrrolidyl); $R_5$ represents a hydrogen atom or an optionally substituted benzyl, alkoxy or alkyl group (e.g. benzyl, p-methylbenzyl, methoxy, ethoxy, ethyl or butyl); $R_6$ and $R_7$ each represents a divalent aromatic group (e.g. phenylene or naphthylene); Y represents a sulfur or oxygen atom; L represents a divalent linkage (e.g. $—SO_2CH_2CH_2NH—SO_2NH$, $—OCH_2SO_2NH$, —O—, or —CH=N—); $R_8$ represents —NR'R" or $—OR_9$ [where R', R" and $R_9$ each represents a hydrogen atom or an optionally substituted alkyl (methyl, ethyl or dodecyl), phenyl (e.g. phenyl, p-methylphenyl or p-methoxyphenyl) or naphthyl (e.g. α-naphthyl or β-naphthyl) group; and m and a n each represents 0 or 1, provided that when $R_8$ is $OR_9$, Y is preferably a sulfur atom.

The following are typical examples of the compounds represented by the general formulas (II) and (IIa):

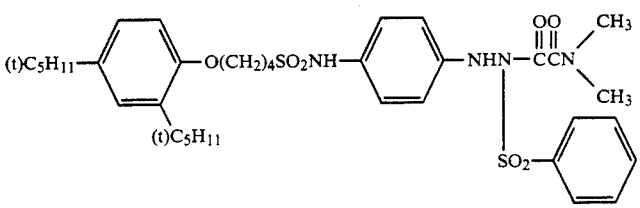

II-1

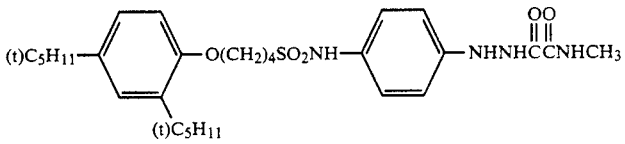

II-2

-continued
II-3
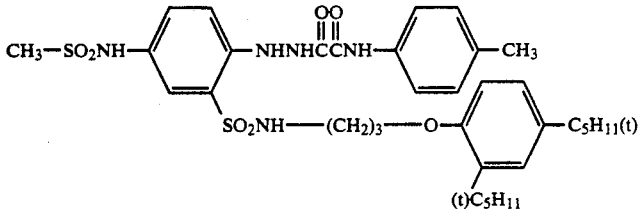
II-4
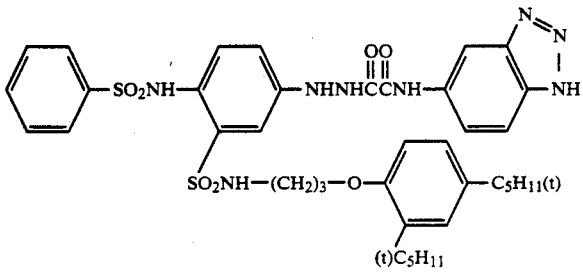
II-5
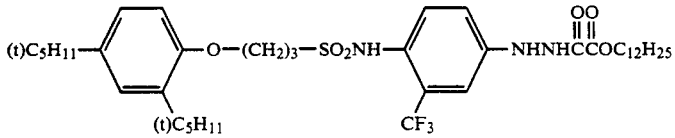
II-6
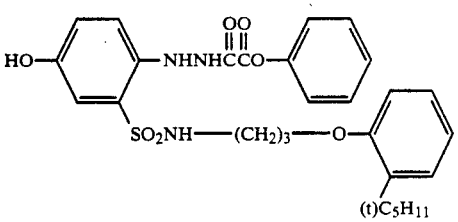
II-7
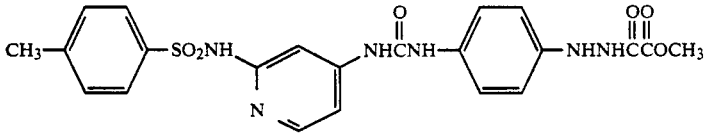
II-8
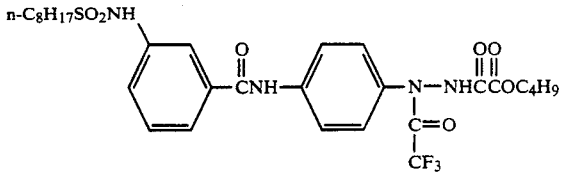
II-9
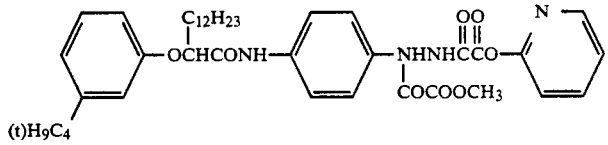
II-10
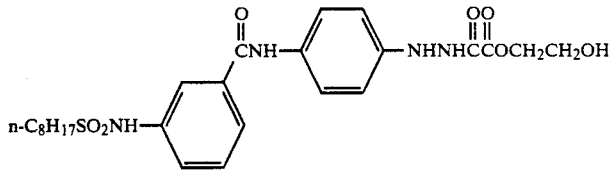

-continued
II-11
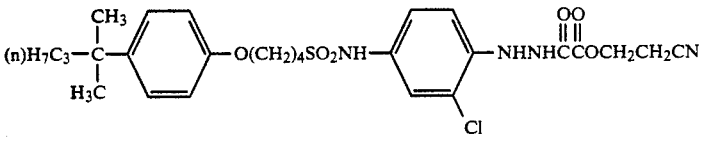
II-12
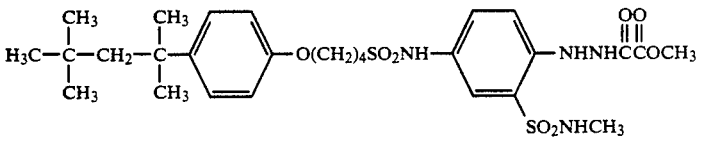
II-13
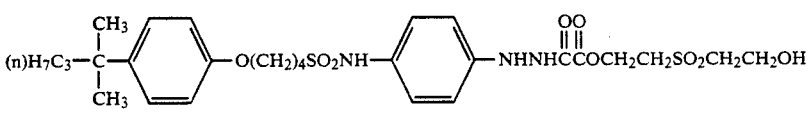
II-14
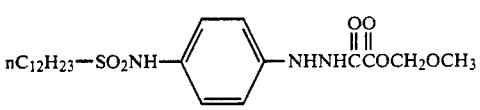
II-15
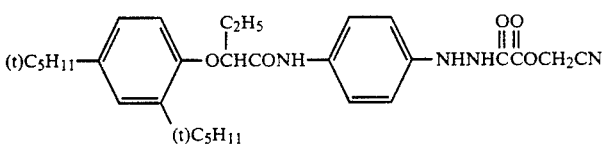
II-16
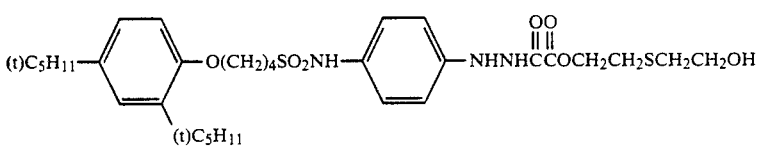
II-17
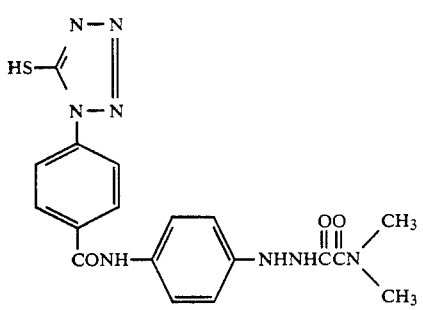
II-18
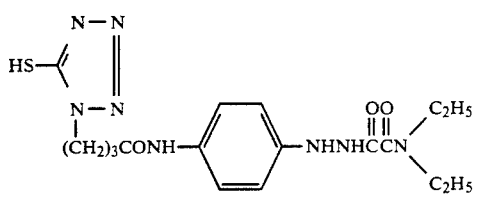

-continued
II-19
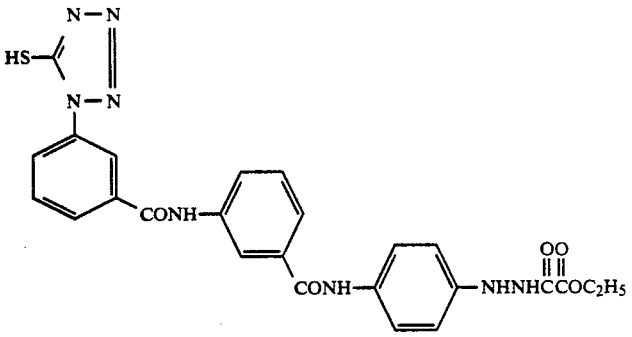
II-20
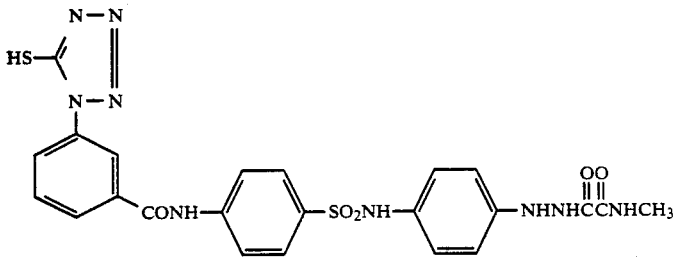
II-21
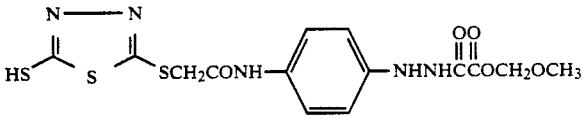
II-22
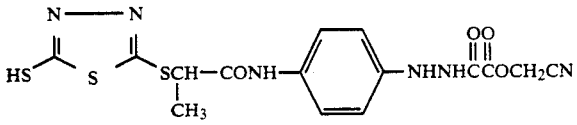
II-23
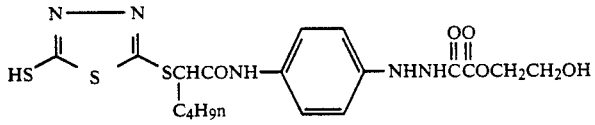
II-24
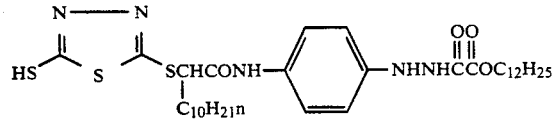
II-25
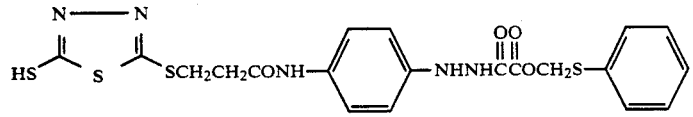
II-26
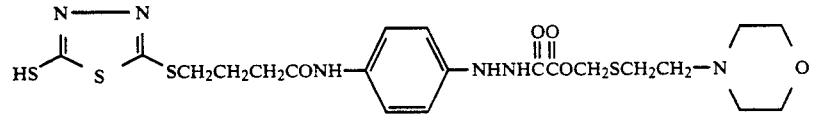
II-27
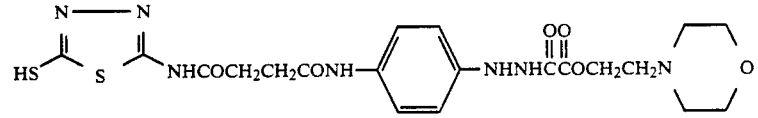

-continued
II-28
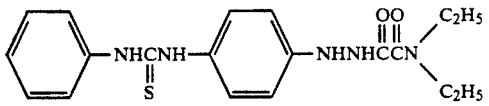
II-29
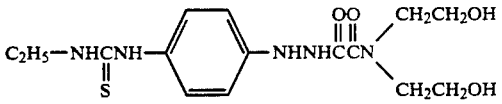
II-30
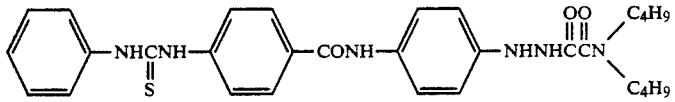
II-31
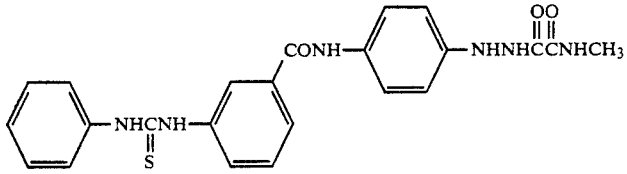
II-32
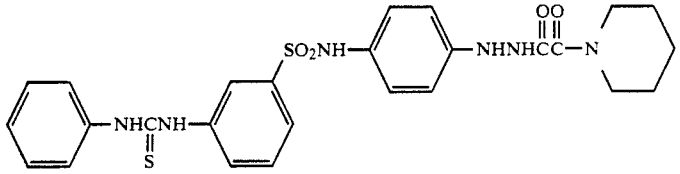
II-33
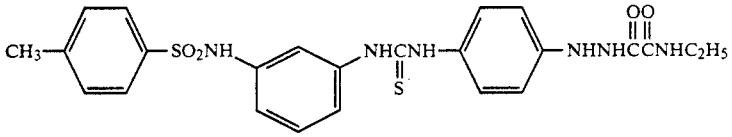
II-34
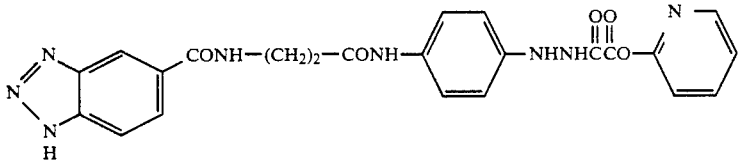
II-35
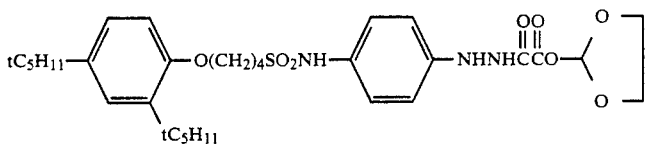
II-36
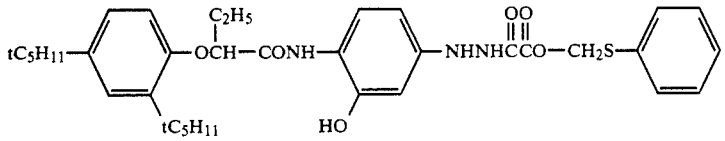
II-37
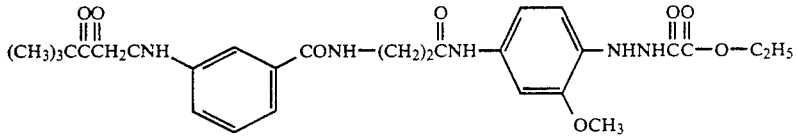

-continued
II-38
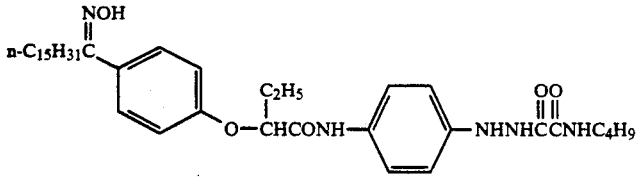
II-39
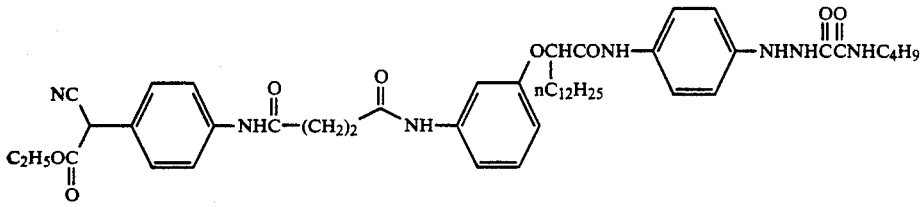
II-40
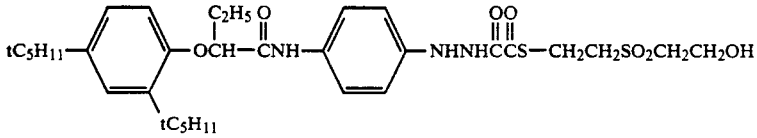
II-41
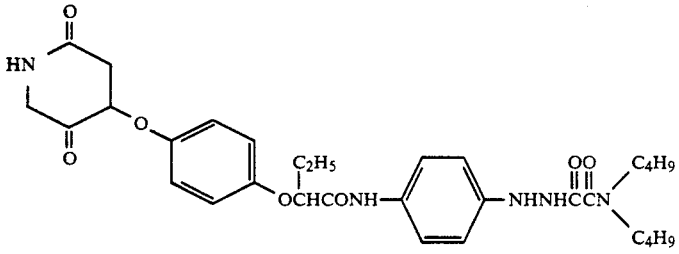
II-42
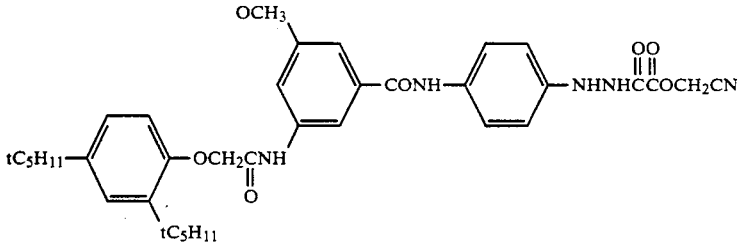
II-43
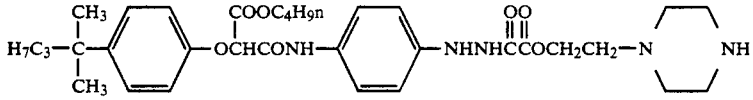
II-44
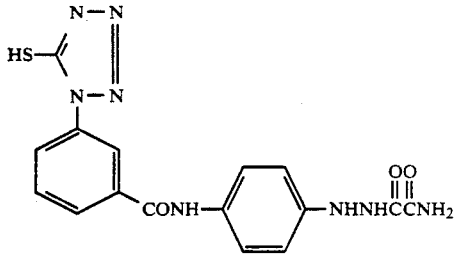
II-45
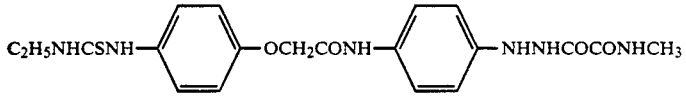

-continued
II-46
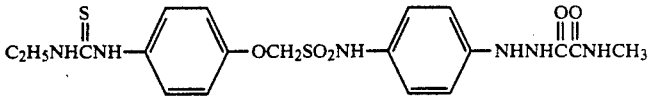
II-47
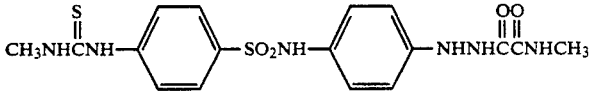
II-48
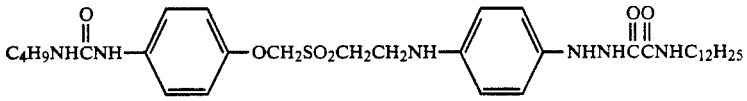
II-49
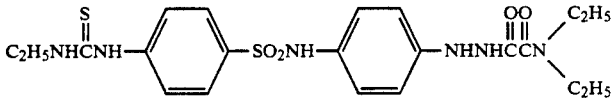
II-50
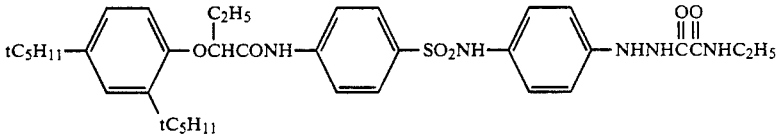
II-51
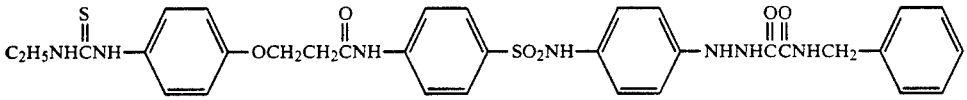
II-52
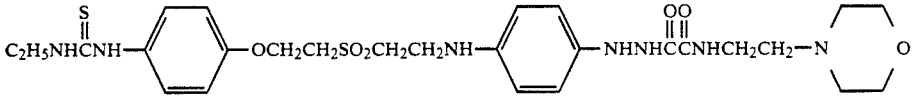
II-53
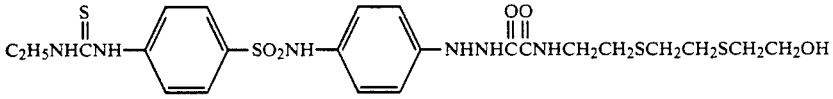
II-54
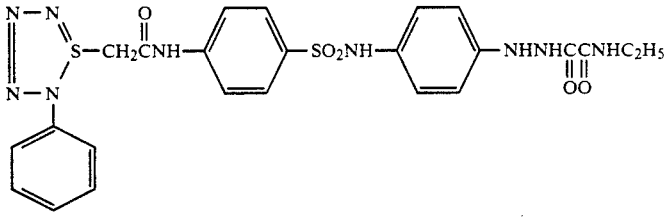
II-55
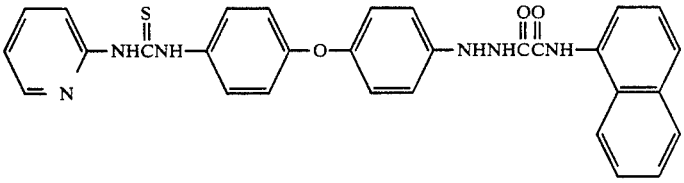
II-56
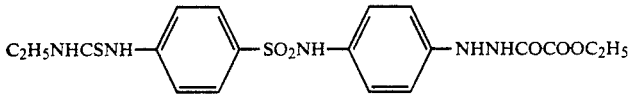
The method of synthesizing the compounds listed above is described below with compounds II-45 and II-47 taken as examples.

Synthesis of Compound II-45

Scheme of synthesis:

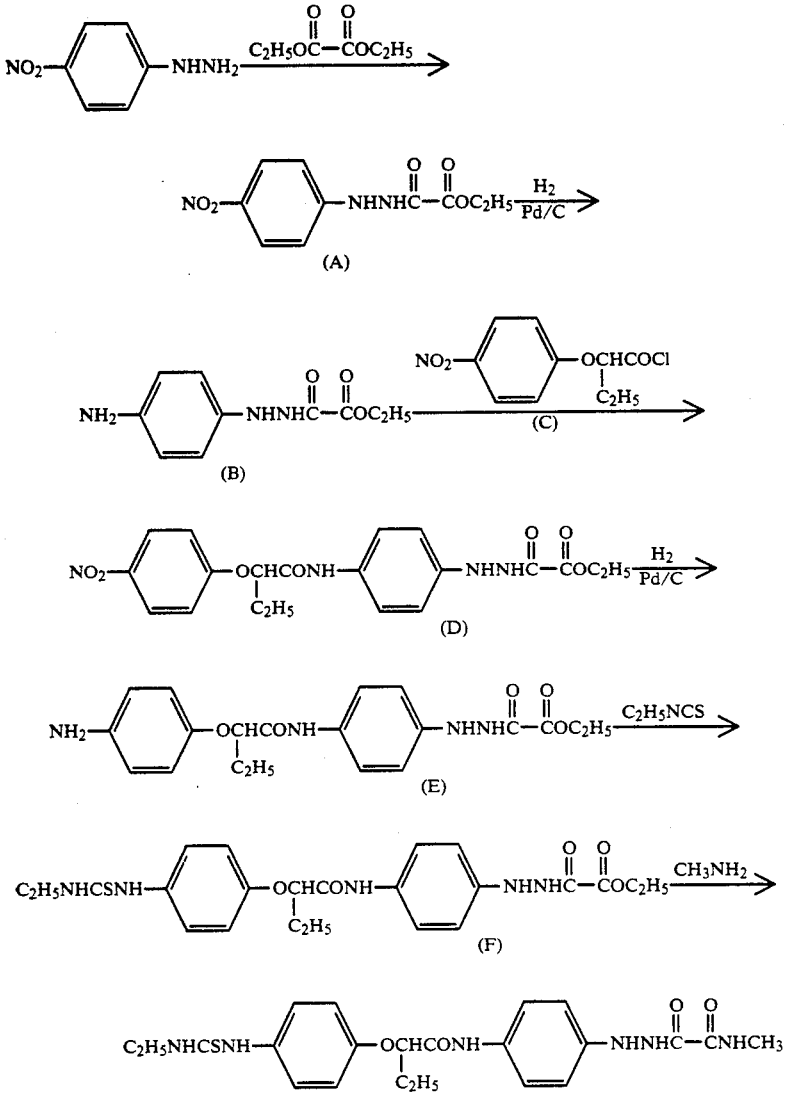

Compound II-45

Two compounds, 4-nitrophenylhydrazine (153 g) and diethyl oxalate (500 m ml), are mixed and refluxed for 1 h. As the reaction proceeds, ethanol is removed and the reation mixture is finally cooled to cause crystal precipitation. After filtration, the crystal is washed with petroleum several times and recrystallized. Fifty grams of the resulting crystal (A) is dissolved in 1000 ml of methanol by heating and reduced in a hydrogen atmosphere under pressure (50 psi) in the presence of a Pd/C (palladium on carbon) catalyst to obtain compound (B).

Twenty-two grams of the compound (B) is dissolved in a mixture of acetonitrile (200 ml) and pyridine (16 g). To the resulting solution, 24 g of compound (C) in acetonitrile is added dropwise at room temperature. The insoluble matter is removed by filtration and the filtrate is concentrated and purified by recrystallization to obtain 31 g of compound (D).

A portion (30 g) of the compound (D) is hydrogenated by the same procedure as described above to obtain 20 g of compound (E).

Ten grams of compound (E) is dissolved in 100 ml of acetonitrile and after adding 3.0 g of ethyl isothiocyanate, the solution is refluxed for 1 h. After distilling off the solvent, the residue is purified by recrystallization to obtain 7.0 g of compound (F). Five grams of compounds (F) is dissolved in 50 mi methanol and the solution is stirred after adding methylamine (8 ml of a 40% aqueous solution). After concentrating methanol to some extent, the precipitating solids are recovered and purified by recrystallization to obtain compound II-45.

Synthesis of Compound II-47

Scheme of synthesis:

-continued

Synthesis of Compound II-47

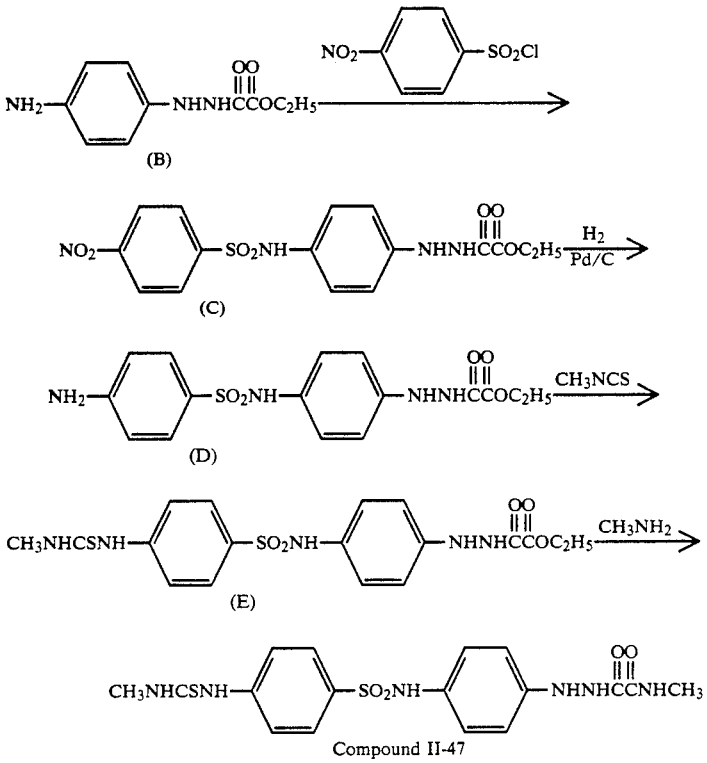

Compound (B) (22 g) is dessolved in 200 ml of pyridine and to the stirred solution, 22 g of p-nitrobenzenesulfonyl chloride is added. After pouring the reaction mixture into water, the precipitating solids are recovered to obtain compound (C). In accordance with the scheme described above, compound (C) is subjected to the same reactions as performed in the synthesis of compound II-45 to obtain compound II-47.

The general formula (III) is as follows:

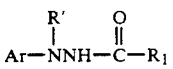

(III)

where Ar is an aryl group containing at least one of a non-diffusible group or a silver halide adsorption accelerating group; $R_1$ is an optionally substituted alkyl, alkoxy or amino group. A preferred non-diffusible group is a ballast group which is commonly employed in couplers and other immobilized photographic additives. A ballast group is a group having at least 8 carbon atoms which is fairly inert to photographic properties and may be selected from among, for example, an alkyl group, an alkoxy group, a phenyl group, an alkylphenyl group, a phenoxy group, an alkylphenoxy group, an amino group, an amido group and an ureido group. Examples of the silver halide adsorption accelerating group include those which are described in U.S. Pat. No. 4,385,108 such as a thiourea group, a thiourethane group, a heterocyclic thioamido group, a mercapto heterocyclic group and a triazole group.

An alkyl group is represented by $R_1$ in the general formula (III) and it is a straight-chained, branched or cyclic alkyl group as exemplified by methyl, ethyl, propyl, butyl, isopropyl, pentyl, cyclohexyl, etc. Examples of the substituent that is introduced into these alkyl groups include: an alkoxy group e.g. methoxy or ethoxy; an aryloxy group e.g. phenoxy or or p-chlorophenoxy; a heterocyclic oxy group e.g. pyridyloxy; a mercapto group; an alkylthio group e.g. methylthio or ethylthio; an arylthio group e.g. phenylthio or p-chlorophenylthia; a heterocyclic thio group e.g. pyridylthio, pyrimidylthio or thiazolylthio; an alkylsulfonyl e.g. methanesulfonyl or butanesulfonyl; an arylsulfonyl group e.g. benzenesulfonyl; a heterocyclic sulfonyl group e.g. pyridylsulfonyl or morpholinosulfonyl; an acyl group e.g. acetyl or benzoyl; a cyano group; a chlorine atom; a bromine atom; an alkoxycarbonyl group e.g. ethoxycarbonyl or methoxycarbonyl; an aryloxycarbonyl group e.g. phenoxycarbonyl; a carboxy group; a carbamoyl group; an alkylcarbamoyl group e.g. N-methylcarbamoyl or N,N-dimethylcarbamoyl; an arylcarbamoyl group e.g. N-phenylcarbamoyl; an amino group; an alkylamino group e.g. methylamino or N,N-dimethylamino; an arylamino group e.g. phenylamino or naphthylamino; an acylamino group e.g. acetylamino or benzoylamino; an alkoxycarbonylamino group e.g. ethyoxycarbonylamino; an aryloxycarbonylamino group e.g. phenoxycarbonylamino; an acyloxy group e.g. acetyloxy or benzoyloxy; an alkylaminocarbonyloxy group e.g. methylaminocarbonyloxy; an arylaminocarbonyloxy group e.g. phenylaminocarbonyloxy; a sulfo group; a sulfamoyl group; an alkylsulfamoyl group e.g. methylsulfamoyl; and an arylsulfamoyl group e.g. phenylsulfamoyl.

Examples of the substituent represented by R' include sulfonyl group (e.g. methanesulfonyl or toluenesulfonyl), an acyl group (e.g. acetyl or trifluoroacetyl) or an oxalyl group (e.g. ethoxalyl).

Of the compounds of the general formula (III), those represented by the following general formula (IIIa) are particularly preferable:

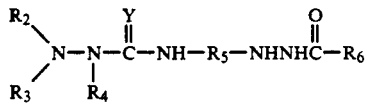

where $R_2$, $R_3$ and $R_4$ each represents a hydrogen atom, an optionally substituted aliphatic group, e.g. an alkyl group such as methyl, ethyl, buthyl, 3-aryloxypropyl or cyclohexyl; an optionally substituted aromatic group, e.g. a phenyl or naphthyl group; an optionally substituted heterocyclic group, e.g. a pyridyl or pyrrolidyl group; an optionally substituted alkoxy group, e.g. a methoxy, ethoxy or buthoxy group; or an optionally substituted aryloxy group, e.g. a phenoxy or 4pmethylphenoxy group.

Preferable as $R_2$ and $R_3$ are an alkoxy group and a substituted alkyl group, the substituent being an alkoxy or aryl group or the like.

Preferable as $R_4$ is a hydrogen atom or an alkyl group.

$R_5$ represents a divalent aromatic group, e.g. a phenylene or naphthylene group, and Y represents a sulfur atom or an oxygen atom.

$R_6$ represents an optionally substituted alkyl, alkoxy or amino group, the substituent being an alkoxy, cyano or aryl group or the like.

The following are typical examples of the compound represented by the general formula (III):

III-1

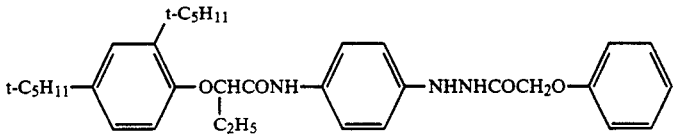

III-2

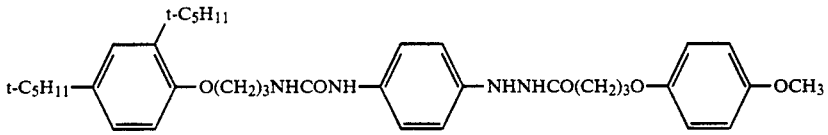

III-3

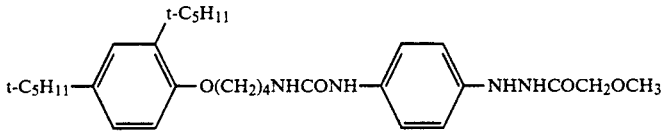

III-4

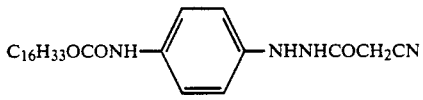

III-5

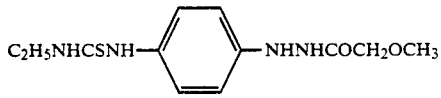

III-6

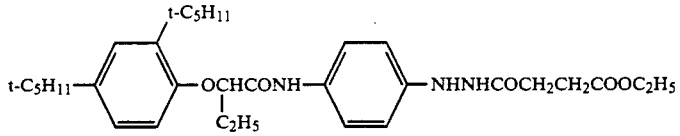

III-7

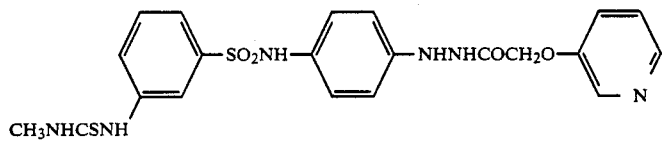

III-8

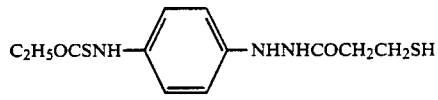

III-9

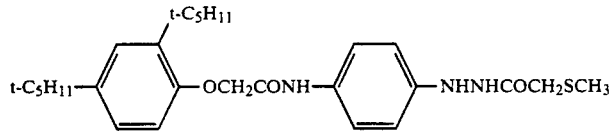

-continued
III-10
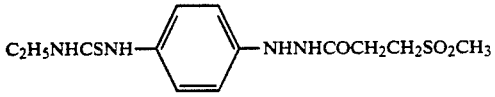
III-11
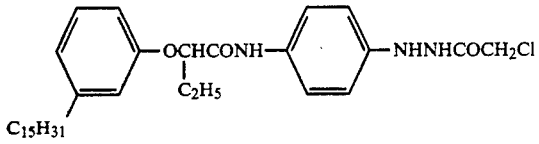
III-12
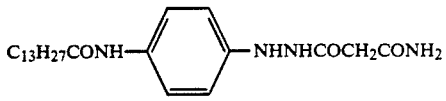
III-13
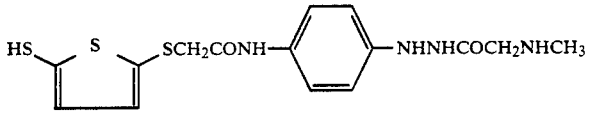
III-14
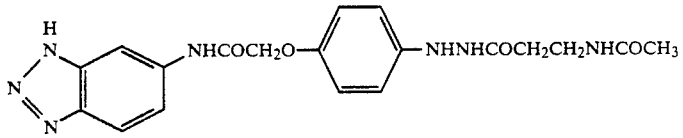
III-15
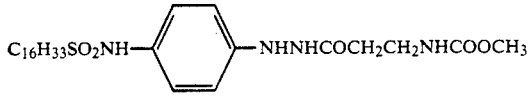
III-16
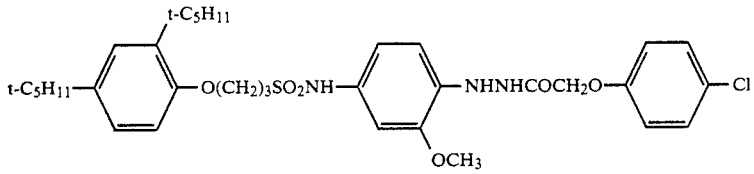
III-17
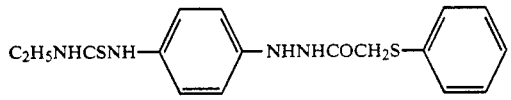
III-18
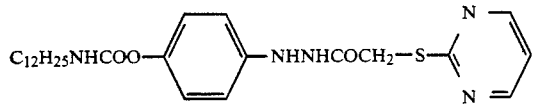
III-19
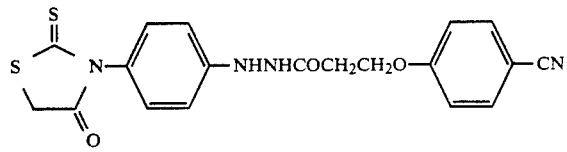
III-20
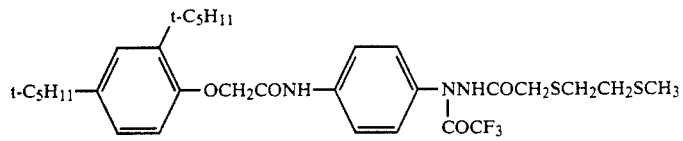

-continued
III-21
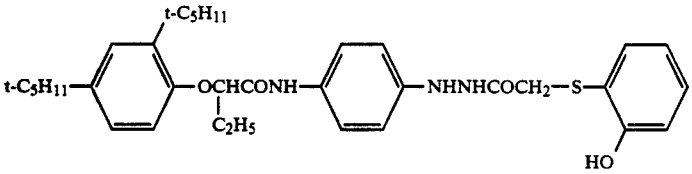
III-22
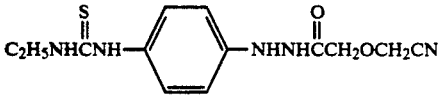
III-23
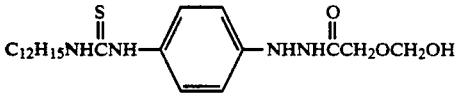
III-24
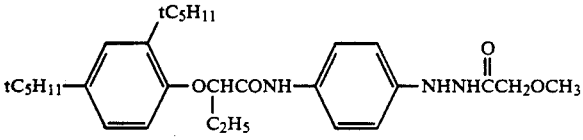
III-25
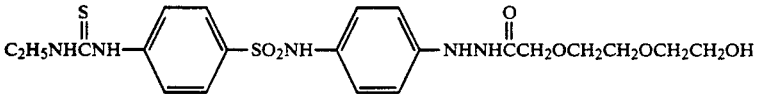
III-26
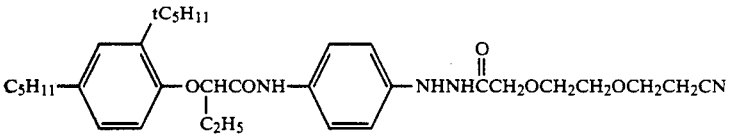
III-27
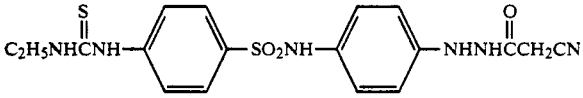
III-28
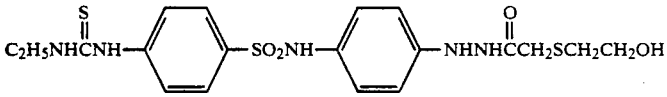
III-29
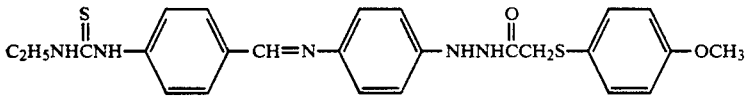
III-30
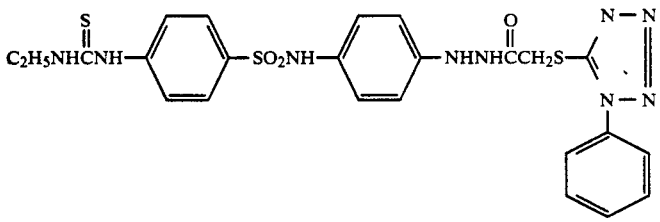
III-31
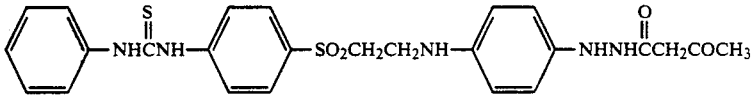
III-32
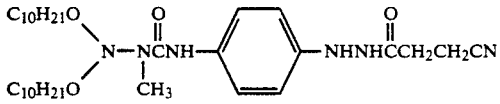

-continued
III-33
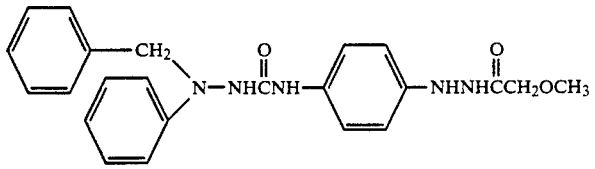
III-34
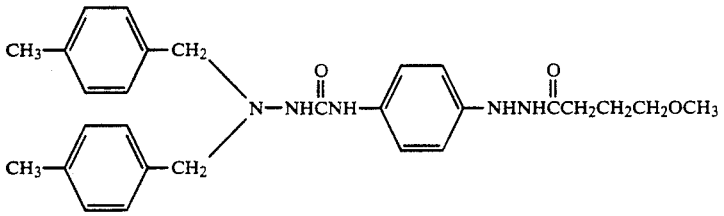
III-35
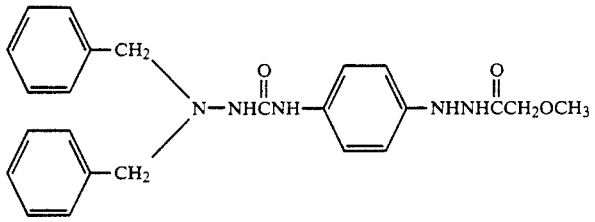
III-36
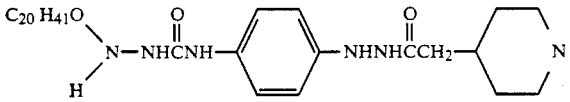
III-37
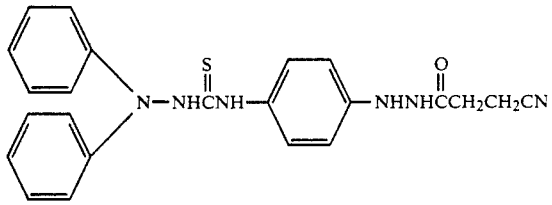
III-38
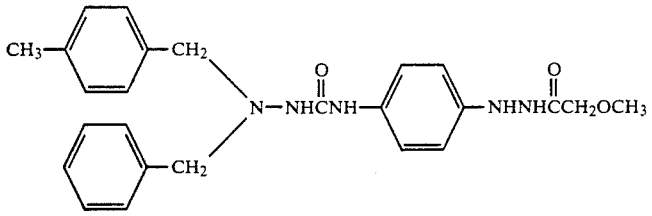
III-39
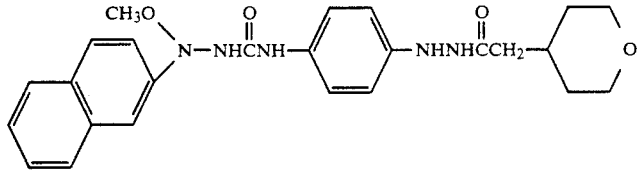
III-40
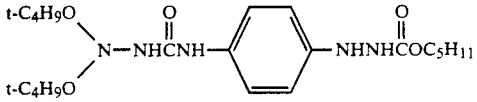

-continued
III-41
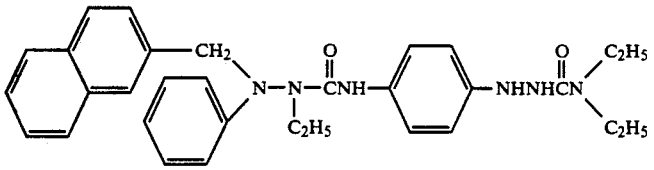
III-42
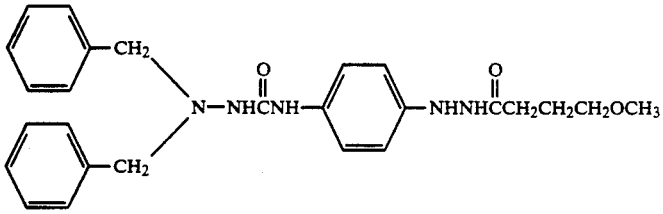
III-43
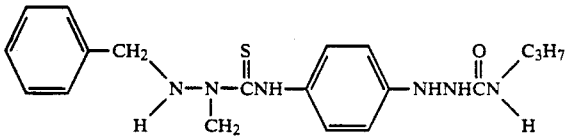
III-44
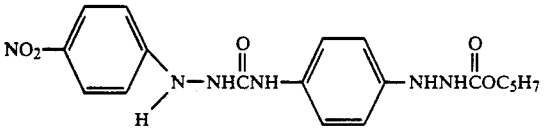
III-45
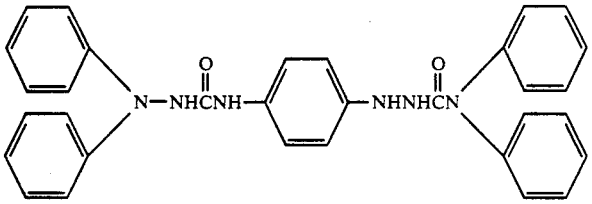
III-46
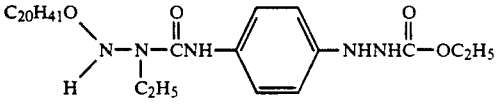
III-47
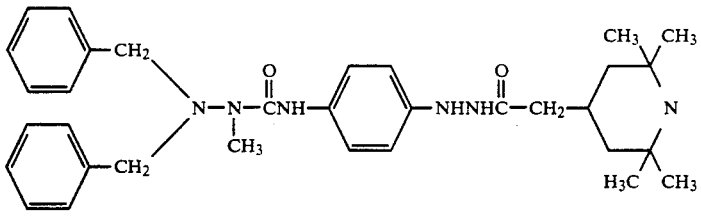
III-48
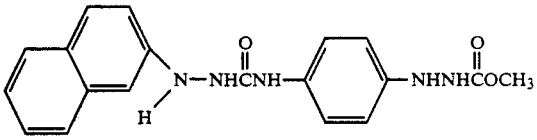
III-49
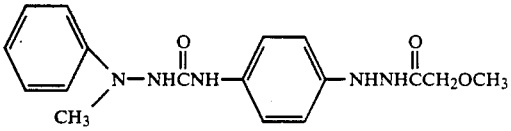

Compound III-5 may be synthesized by the following procedure.

Synthesis of compound III-5

Scheme of synthesis:

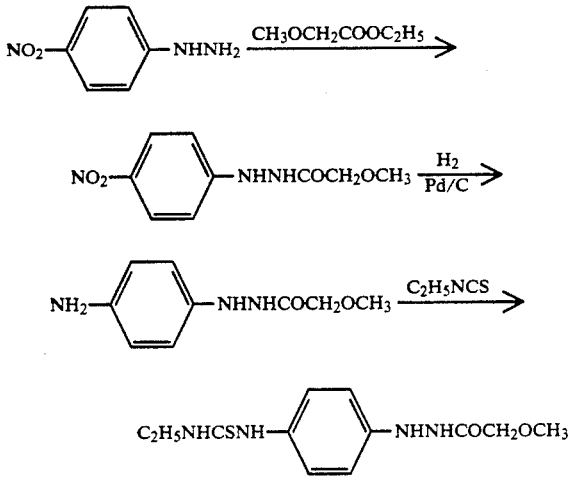

Compound III-5 can be synthesized as in the case of synthesis of compound II-45.

One or more of the compounds (I), (II) and (III) are contained in the silver halide photographic material of the present invention in a total amount which preferably ranges from $5\times10^{-7}$ to $5\times10^{-1}$ moles, more preferably from $5\times10^{-5}$ to $1\times10^{-2}$ mole, per mole of silver halide contained in said photographic material.

Hydrazide compounds may be incorporated in either the light-sensitive material or a developer or both in accordance with the present invention. If they are to be incorporated in the light-sensitive material, it may be contained in a light-sensitive silver halide emulsion layer containing a 3-pyrazolidone compound and/or a trihydroxybenzene compound and/or in at least one of other layers coated on the support in such a way that the incorporated hydrazide compounds will have diffused into said emulsion layer by the time development starts. If hydrazide compounds are to be incorporated in the lights-sensitive material, they are suitably used in amounts ranging from $10^{-6}$ to $10^{-1}$ mole per mole of silver halide, preferably from $10^{-4}$ to $10^{-2}$ mole per mole of silver halide. A suitable amount can be determined in consideration of the balance with other factors such as the silver halide composition, the size of silver halide grains, the degree of their chemical ripening, the amount of a hydrophilic colloid used as a binder, and the amounts of other additives such as a stabilizer, a restrainer and an accelerator.

If hydrazide compounds are to be incorporated in a developer, they are usually added in amounts ranging from $10^{-5}$ to $10^{-2}$ mole, preferably from $10^{-4}$ to $10^{-3}$ mole, per liter of the developer. A suitable amount is determined in consideration of the balance with other factors such as the amino compound used, pH and fog restrainer used.

The general formula (IV) is as follows:

$$R_1-O\leftarrow CH_2CH_2O)_nH \qquad \text{(IV)}$$

Where $R_1$ is a hydrogen atom or a substituted or unsubstituted aromatic ring; and n is an integer of 10-200.

The following are non-limiting preferred examples of the compound represented by the general formula (IV):

| | | |
|---|---|---|
| $HO(CH_2CH_2O)_nH$ | n = 10 | IV-1 |
| $HO(CH_2CH_2O)_nH$ | n = 30 | IV-2 |
| $HO(CH_2CH_2O)_nH$ | n = 50 | IV-3 |
| $HO(CH_2CH_2O)_nH$ | n = 70 | IV-4 |
| $HO(CH_2CH_2O)_nH$ | n = 150 | IV-5 |
| $HO(CH_2CH_2O)_nH$ | n = 200 | IV-6 |

IV-7

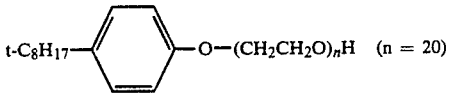

IV-8

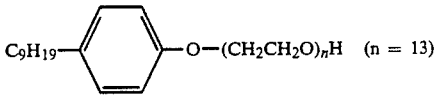

IV-9

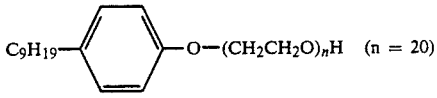

IV-10

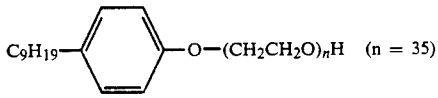

IV-11

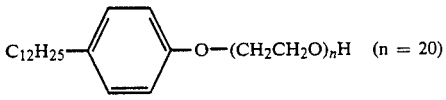

IV-12

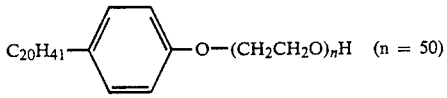

IV-13

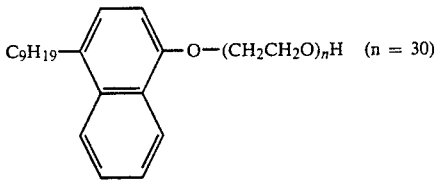

IV-14

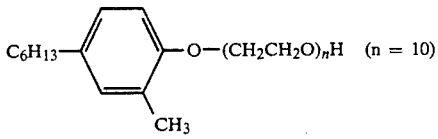

IV-15

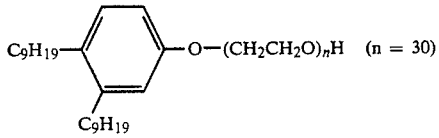

IV-16

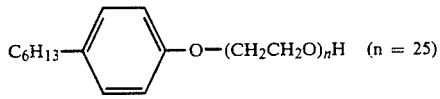

-continued

IV-17

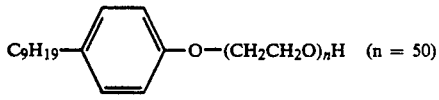

Of the above compounds of the general formula (IV), those of IV-1 to IV-6, IV-9 and IV-10 are more preferable, particularly IV-3, IV-9 and IV-10.

These compounds are readily available from the commercial market. They are preferably added in an amount of 0.01–4.0 moles, more preferably from 0.02 to 2 moles, per mole of silver halide. Two or more compounds having different values of n may be used in admixture.

The silver halide emulsion to be used in the light-sensitive material of the present invention may employ various silver halides such as silver chloride, silver bromide, silver chlorobromide, silver iodobromide and silver chloroiodobromide. The present invention proves effective with silver bromide and silver iodobromide, with particular advantage being exhibited with a high-sensitivity light-sensitive material having a small content (≦5 mol %, particularly 1.5 to 3 mol %) of silver iodide. The present invention proves particularly effective with an emulsion obtained by adding a water-soluble iodide at the stage of adjustment.

The silver halide emulsion to be used in the present invention may be such that silver halide grains are suspended in a hydrophilic colloid by a known method such as the neutral method, ammoniacal method, single-jet method or double-jet method.

The silver halide emulsion layer in the light-sensitive material of the present invention preferably contains a silver halide composed of grains having an average size of 0.1–1.0 μm, more preferably 0.1–0.7 μm, with at least 75%, preferably at least 80%, of the total grains having a grain size ranging from 0.7–1.3 times the average grain size.

A silver halide emulsion having polyvalent metallic ions (e.g. iridium or rhodium) occluded therein may also be used and examples of such emulsion are described in U.S. Pat. Nos. 3,211,157, 3,447,927 and 3,531,291. Silver halide emulsions used in the present invention may be chemically sensitized by a common method such as the use of sulfur compounds or gold compounds exemplified by chloroaurates and gold trichloride.

The silver halide emulsion to be used in the present invention may be treated with spectral sensitizers to have sensitivity to colors in desired spectral ranges of wavelength. Common spectral sensitizers may be used for this purpose and they include methine and styryl dyes such as cyanine, hemicyanine, rhodacyanine, merocyanine, exanole and hemioxonole. Regarding spectral sensitizers, reference may be made to various prior patents such as U.S. Pat. Nos. 2,742,833, 2,756,148, 3,567,458, 3,615,517, 3,615,519, 3,632,340, 3,155,519, 3,384,485, 4,232,115, 2,796,580, 4,028,110, 3,752,673 and JP-A-55-45015.

The silver halide photographic emulsion in the light-sensitive material of the present invention may be used with common hardeners such as aldehydes (e.g. formaldehyde, glyoxal, glutaraldehyde and mucochloric acid), N-methylol compounds (e.g. dimethylolurea and methylol dimethyl hydantoin), dioxane derivatives (e.g. 2,3-dihydroxydioxane), active vinyl compounds (e.g. 1,3,5-triacryloylhexahydro-s-triazine and bis (vinylsulfonyl) methyl ether), and active halide (e.g. 2,4-dichloro-6-hydroxy-s-triazine), which may be used either on their own or as admixtures. The emulsion may also be used with common thickeners, matting agents and coating aids. Suitable binders are hydrophilic binders that work as protective colloids and which are commonly used in the art.

The light-sensitive material of the present invention may further contain various other additives such as couplers, ultraviolet absorbers, brighteners, image stabilizers, antioxidants, lubricants, metallic ion sequestering agents and emulsifying/dispersing agents, which are selected in accordance with the specific object of interest.

Besides the silver halide emulsion layer, the light-sensitive material of the present invention may have other photographic layers such as a protective layer, an intermediate layer, a filter layer, an anti-halation layer, a subbing layer, an auxiliary layer, an anti-irradiation layer and a backing layer. Various supports may be employed as selected from among, for example, baryta paper, polyethylene-coated paper, cellulose acetate, cellulose nitrate and polyethylene terephthalate, in accordance with the specific use of the light-sensitive material.

Polymer latices made of homo- or copolymers of monomeric compounds such as alkyl acrylates, alkyl methacrylates, acrylic acid or glycidyl acrylate may be contained in the light-sensitive silver halide emulsion layer or some other layers coated on the support in order to attain certain purposes such as improvements in the dimensional stability of the photographic material and in its film properties.

A stabilizer or an anti-foggant may be contained in the light-sensitive silver halide emulsion, with a suitable one being selected from among many compounds including 4-hydroxy-6-methyl-1,3,3a, 7-tetraazaindene, 1-phenyl-5-mercaptotetrazole, resorcinol oxime and hydroquinone aldoxime. These compounds can be incorporated in amounts ranging from $10^{-4}$ to $10^{-1}$ mole per mole of silver halide.

The following examples are provided for the purpose of further illustrating the present invention but are in no way to be taken as limiting.

EXAMPLE 1

Preparation of silver halide photographic materials

A polyethylene terephthalate film with a thickness of 100 μm that had a subbing layer (see Example 1 of JP-A-59-19941) on each sides in a thickness of 0.1 μm was used as a support. The subbing layer on one side was coated with a silver halide emulsion layer (for its composition, see recipe (1) below) to give a gelatin and a silver deposit of 2.0 g/m$^2$ and 3.5 g/m$^2$, respectively. The resulting emulsion layer was coated with a protective layer according to recipe (2) shown below, to give a gelatin deposit of 1.5 g/m$^2$. The subbing layer on the other side was coated with a backing layer according to recipe (3) shown below, to give a gelatin deposit of 2.7 g/m$^2$. The backing layer was coated with a protective layer according to recipe (4) shown below, to give a gelatin deposit of 1 g/m$^2$. By these procedures, sample Nos. 1–17 of photographic material were prepared.

Recipie (1) (formulation of silver halide emulsion layer)

| | |
|---|---|
| Gelatin | 2.0 g/m$^2$ |
| Silver iodobromide emulsion (a) | 3.5 g/m$^2$ |
| (Silver iodobromide emulsion (a) was prepared by the double-jet method and it comprised AgIBr grains having an average size of 0.20 μm and consisting of 98 mol % AgBr and 2 mol % AgI. In the mixing step, $K_2IrCl_6$ was added in an amount of $6 \times 10^{-7}$ moles per mole of Ag. This emulsion was washed and desalted in the usual manner and subsequently treated with an aqueous solution of KI to adjust its pAg to 8.80 at 40° C.) | |
| Spectral sensitizer | 8 g/m$^2$ |

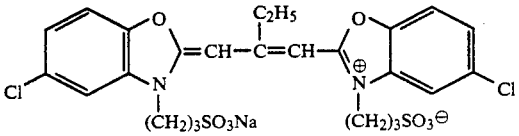

| | |
|---|---|
| Hydroquinone | 25 g/m$^2$ |
| 4-Methyl-6-hydroxy-1,3,3a,7-tetrazaindene | 30 g/m$^2$ |
| Compound within the scope of the present invention or comparative compound | (see Table 1) |
| Saponin | 0.1 g/m$^2$ |

Recipe (2) (formulation of emulsion protective layer)

| | |
|---|---|
| Gelatin | 1.5 g/m$^2$ |
| Matting agent (particulate polymethyl methacrylate with an average grain size of 3.0–5.0 μm) | 0.05 g/m$^2$ |
| Colloidal silica | 0.02 g/m$^2$ |
| Surfactant A | 0.01 g/m$^2$ |

$CH_2COOCH_2CH(C_2H_5)C_4H_9$
|
$CHCOOCH_2CH(C_2H_5)C_4H_9$
|
$SO_3Na$

| | |
|---|---|
| Hardener: $(CH_2{=}CHSO_2CH_2)_2O$ | 0.10 g/m$^2$ |

Recipe (3) (formulation of backing layer)

| | |
|---|---|
| Gelatin | 2.7 g/m$^2$ |
| Dye (d) | 0.12 g/m$^2$ |

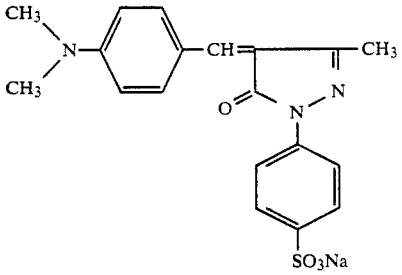

| | |
|---|---|
| Dye (e) | 0.03 g/m$^2$ |

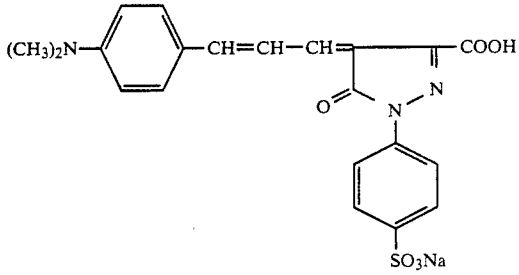

| | |
|---|---|
| Dye (f) | 0.04 g/m$^2$ |

-continued

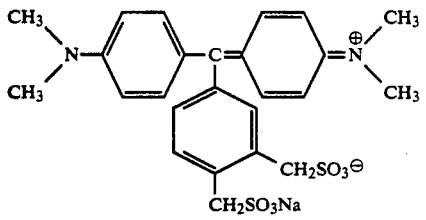

| | |
|---|---|
| Surfactant (saponin) | 0.1 g/m$^2$ |
| Sodium dodecylbenzenesulfonate | 0.01 g/m$^2$ |
| Hardener (glyoxal) | 0.01 g/m$^2$ |
| Recipe (4) (formulation of backing protective layer) | |
| Gelatin | 1 g/m$^2$ |
| Matting agent (particulate polymethyl methacrylate with an average grain size of 3.0–5.0 μm) | 0.05 g/m$^2$ |
| Surfactant A | 0.01 g/m$^2$ |
| Hardener (glyoxal) | 0.01 g/m$^2$ |

The samples prepared were subjected to a halftone dot quality test by the following method.

Halftone Dot Quality Test

A contact screen (50% dot area; 150 lines per inch) was partly attached to a step wedge and a sample placed in close proximity with the contact screen was exposed to light from a xenon lamp for 5 seconds. The exposed sample was then developed with a rapid access automatic processor supplied with a developer having the formulation shown below. The quality of halftone dots in the processed samples was observed with a magnifier (×100) and rated by a five-score method, with the best sample (having the highest quality of halftone dots) being given score 5 and followed by 4, 3, 2 and 1 in the decreasing order of quality. Samples rated "1" and "2" were unacceptable for practical purposes.

The samples were also evaluated for the presence of black peppers in halftone dots; the sample which was entirely free from black peppers in halftone dots was given a maximum score 5 and followed by 4, 3, 2 and 1 in the increasing order of the frequency of black peppers that developed in halftone dots. Samples rated "1" and "2" were unacceptable for practical purposes because of the great size of black peppers that developed.

Density measurements were conducted on the samples with a digital densitometer (Model PDP-65 of Konica Corp.) and the results were evaluated in terms of relative values, with the value for sample No. 1 at density 3.0 being taken as 100. Gamma values were also calculated ($\gamma$=the tangent of angle $\alpha$ formed by the horizontal axis and the straight-line portion of the characteristic curve connecting two points at densities of 0.3 and 3.0).

| Formulation of developer | |
|---|---|
| Ethylenediaminetetraacetic acid disodium salt | 1 g |
| Sodium sulfite | 60 g |
| Hydroquinone | 35 g |
| 5-Amino-1-pentanol | 50 g |
| Sodium bromide | 2.5 g |
| 5-Methylbenzotriazole | 0.3 g |
| 1-Phenyl-3-pyrazolidone | 0.2 g |
| Water | to make 1,000 ml |
| pH adjusted to 11.5 with sodium hydroxide | |

Formulation of fixing solution

-continued

| | |
|---|---|
| Recipe A: | |
| Ammonium thiosulfate (72.5% W/V aq. sol.) | 240 ml |
| Sodium sulfite | 17 g |
| Sodium acetate ($3H_2O$) | 6.5 g |
| Boric acid | 6 g |
| Sodium citrate ($2H_2O$) | 2 g |
| Recipe B: | |
| Pure water (ion-exchanged water) | 17 ml |
| Sulfuric acid (50% W/V aq. sol.) | 4.7 g |
| Aluminum sulfate (8.1% W/V aq. sol. in terms of $Al_2O_3$ content) | 26.5 g |

Recipes A and B were successively dissolved in 500 ml of water and the solution was worked up to 1,000 ml to be used as a fixing solution. The fixing solution as prepared was adjusted to a pH of 6 with acetic acid.

Processing scheme

| Steps | Temperature | Time |
|---|---|---|
| Development | 40° C. | 15 sec |
| Fixing | 35° C. | 10 sec |
| Rinsing | 30° C. | 10 sec |
| Drying | 50° C. | 10 sec |

The following compounds (a) to (c) were added as comparative compounds to the silver halide emulsion layer in Recipe (1).

(a)

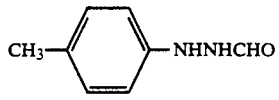

(b)

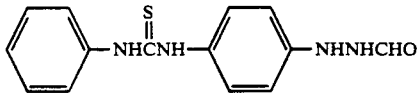

(c)

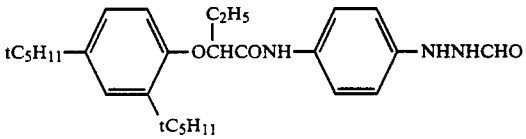

TABLE 1

| Sample No. | Hydrazide compound Identification | Hydrazide compound Amount, mg/m² | Compound formula (IV) Identification | Compound formula (IV) Amount, mg/m² | Relative sensitivity | Gamma | Quality of halftone dots | Black pepper | Remarks |
|---|---|---|---|---|---|---|---|---|---|
| 1 | a | 35 | — | — | 100 | 10.0 | 3 | 3 | comparison |
| 2 | b | 35 | — | — | 101 | 10.9 | 3 | 3 | " |
| 3 | c | 35 | — | — | 105 | 10.1 | 3 | 3 | " |
| 4 | c | 35 | IV-4 | 100 | 105 | 10.2 | 3 | 3 | " |
| 5 | III-3 | 35 | — | — | 110 | 15.3 | 4 | 4 | " |
| 6 | III-3 | 35 | IV-4 | 100 | 137 | 16.7 | 5 | 5 | the invention |
| 7 | III-3 | 35 | IV-3 | 100 | 130 | 16.5 | 5 | 5 | " |
| 8 | III-3 | 35 | IV-8 | 100 | 121 | 15.5 | 4 | 5 | " |
| 9 | III-3 | 35 | IV-9 | 100 | 122 | 15.5 | 4 | 4 | " |
| 10 | I-10 | 35 | IV-4 | 100 | 125 | 15.7 | 5 | 5 | " |
| 11 | II-5 | 35 | IV-4 | 100 | 128 | 15.8 | 5 | 4 | " |
| 12 | II-13 | 35 | IV-4 | 100 | 121 | 15.3 | 5 | 5 | " |
| 13 | III-16 | 35 | IV-4 | 100 | 131 | 15.8 | 5 | 5 | " |
| 14 | III-20 | 35 | IV-4 | 100 | 130 | 15.7 | 5 | 5 | " |
| 15 | III-22 | 35 | IV-4 | 100 | 128 | 15.8 | 5 | 5 | " |
| 16 | — | — | — | — | 30 | 4.0 | 3 | 2 | comparison |
| 17 | III-35 | 35 | IV-4 | 100 | 138 | 16.7 | 5 | 5 | the invention |

The results of Example 1 are shown in Table 1.

As is clear from Table 1, sample Nos. 6–15 and 17 according to the present invention had higher sensitivity and formed more contrasty image with better quality of halftone dots and fewer black peppers than the comparative samples.

-continued

| Formulation of developer | |
|---|---|
| n-Butyl diethanolamine | 15. g |
| Water | to make 1,000 ml |
| pH adjusted to 11.6 | |

TABLE 2

| Sample No. | Hydrazide compound Identification | Hydrazide compound Amount, mg/m² | Compound formula (IV) Identification | Compound formula (IV) Amount, mg/m² | Relative sensitivity | Gamma | Quality of halftone dots | Black pepper | Remarks |
|---|---|---|---|---|---|---|---|---|---|
| 1 | a | 35 | — | — | 100 | 9.0 | 2 | 2 | comparison |
| 2 | b | 35 | — | — | 102 | 9.5 | 2 | 2 | " |
| 3 | c | 35 | — | — | 103 | 8.8 | 2 | 2 | " |
| 4 | c | 35 | IV-4 | 100 | 103 | 9.6 | 2 | 3 | " |
| 5 | III-3 | 35 | — | — | 103 | 12.1 | 3 | 2 | " |
| 6 | III-3 | 35 | IV-4 | 100 | 135 | 16.1 | 5 | 5 | the invention |
| 7 | III-3 | 35 | IV-3 | 100 | 133 | 15.5 | 5 | 4 | " |
| 8 | III-3 | 35 | IV-8 | 100 | 130 | 15.3 | 5 | 5 | " |
| 9 | III-3 | 35 | IV-9 | 100 | 138 | 16.2 | 4 | 4 | " |
| 10 | I-10 | 35 | IV-4 | 100 | 120 | 16.3 | 4 | 4 | " |
| 11 | II-5 | 35 | IV-4 | 100 | 125 | 16.2 | 4 | 4 | " |
| 12 | II-13 | 35 | IV-4 | 100 | 125 | 15.9 | 5 | 5 | " |
| 13 | III-16 | 35 | IV-4 | 100 | 122 | 15.8 | 4 | 5 | " |
| 14 | III-20 | 35 | IV-4 | 100 | 123 | 15.9 | 4 | 4 | " |
| 15 | III-22 | 35 | IV-4 | 100 | 121 | 15.7 | 5 | 5 | " |
| 16 | — | — | — | — | 40 | 4.0 | 1 | 3 | comparison |
| 17 | III-35 | 35 | IV-4 | 100 | 136 | 16.3 | 5 | 5 | the invention |

EXAMPLE 2

The procedure of Example 1 was repeated except that the samples prepared in it were processed with a developer having the formulation described below. The results are shown in Table 2.

| Formulation of developer | |
|---|---|
| Hydroquinone | 45.0 g |
| N-Methyl-p-aminophenol hemisulfate | 0.8 g |
| Sodium hydroxide | 18.0 g |
| Potassium hydroxide | 55.0 g |
| 5-Sulfosalicylic acid | 45.0 g |
| Boric acid | 25.0 g |
| Potassium sulfite | 110.g g |
| Ethylenediaminetetraacetic acid disodium salt | 1.0 g |
| Potassium bromide | 6.0 g |
| 5-Methylbenzotriazole | 15.0 g |

Like Table 1, Table 2 shows that sample Nos. 6–15 and 17 according to the present invention had higher sensitivity and formed more contrasty image with better quality of halftone dots and fewer black peppers than the comparative samples.

EXAMPLE 3

Silver halide (90 mol % AgCl and 10 mol % AgBr) grains having an average size of 0.08 μm and containing rhodium in an amount of $2\times10^{-6}$ mole per mole of silver halide were sulfur-sensitized in the usual manner. Thereafter, a stabilizer or 6-methyl-4-hydroyx-1,3,31,7-tetraazaindene (570 mg per mole of silver halide) and gelatin (25 g) were added. The coating solutions for the necessary layers had the following formulations. The emulsion layer was applied to give a silver deposit of 3.5 g/m².

| Recipe (1) (formulation of silver halide emulsion layer) | |
|---|---|
| Saponin | 100 mg/m$^2$ |
| Potassium bromide | 3 mg/m$^2$ |
| Desensitizing dye | 1 mg/m$^2$ |

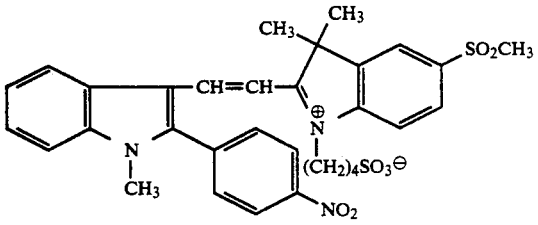

| | |
|---|---|
| Sodium hydroxide | 10 mg/m$^2$ |
| Compound according to the present invention [as represented by the general formula (I), (II), (III) or (IV) or comparative compound | (See Table 3) |
| Sodium dodecylbenzenesulfonate | 21 mg/m$^2$ |
| Butyl acrylate/styrene/acrylic acid copolymel latex | 1 g/m$^2$ |
| 5-Methyl benzotriazole | 10 mg/m$^2$ |
| 5-Phenyl-1-mercaptotetrazole | 11.5 mg/m$^2$ |
| 2-Mercaptobenzimidazolw-5-sulfonic acid | 1 mg/m$^2$ |
| Benzyl-triphenyl phosphonium chloride | 5 mg/m$^2$ |
| Compound (Z) | 5.8 mg/m$^2$ |

Compound (Z)

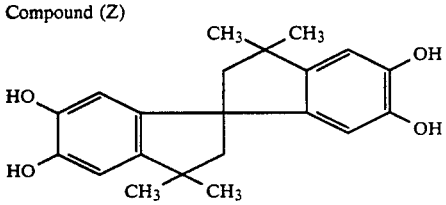

Formulation of emulsion protective layer

| | |
|---|---|
| Gelatin | 1.14 g/m$^2$ |
| Compound (M) (see below) | 32.7 mg/m$^2$ |
| Amorphous silica | 20 mg/m$^2$ |
| Compound (S) (see below) | 0.5 g/m$^2$ |
| Citric acid | 5.4 g/m$^2$ |
| Formaldehyde | 71.5 mg/m$^2$ |
| Compound (K) (see below) | 100 mg/m$^2$ |

Compound (M)

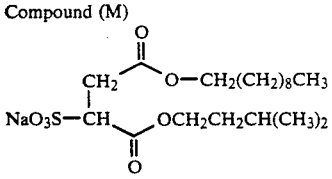

Compound (S)

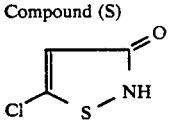

Compound (K)

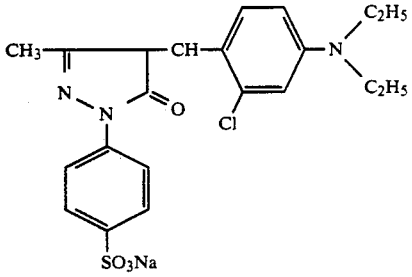

-continued

| Recipe (1) (formulation of silver halide emulsion layer) | |
|---|---|
| Backing layer | |
| Latex polymer (butyl acrylate/styrene copolymer) | 0.5 g/m$^2$ |
| Sponin | 200 mg/m$^2$ |
| Backing dye (g) | 200 mg/m$^2$ |

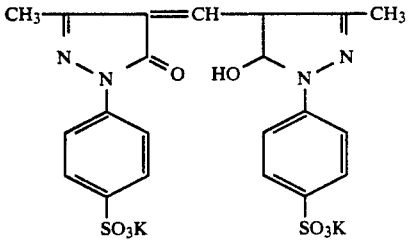

| | |
|---|---|
| Dye (e) (as used in Example 1) | 70 mg/m$^2$ |
| Ossein gelatin | 2.0 g/m$^2$ |
| Backing protective layer | |
| Dioctyl sulfosuccinate ester | 300 mg/m$^2$ |
| Matting agent (particulate methyl methacrylate with an average grain size of 4.0 μm) | 100 mg/m$^2$ |
| Ossein gelatin (isoelectric point, 4.9) | 1.1 g/m$^2$ |
| Fluorinated sodium dodecylbenzenesulfonate | 50 mg/m$^2$ |

The samples prepared in accordance with the recipes shown above were exposed under a quartz iodine light source (halogen lamp) at 1.5 kW for 10 seconds. The discharge tube was a light source having a substantial energy intensity at 400 nm and longer wavelengths. The samples as prepared were such that they could be handled under illumination with an ordinary fluorescent lamp at 300 lux. The exposed samples were developed and subsequently processed as in Example 1 and subjected to similar tests. The test results are shown in Table 3, from which one can see that sample Nos. 6–15 and 17 according to the present invention had higher sensitivity and formed more contrasty image with better quality of halftone dots and fewer black peppers than the comparative samples.

TABLE 3

| Sample No. | Hydrazide compound Identification | Hydrazide compound Amount, mg/m$^2$ | Compound formula (IV) Identification | Compound formula (IV) Amount, mg/m$^2$ | Relative sensitivity | Gamma | Quality of halftone dots | Black pepper | Remarks |
|---|---|---|---|---|---|---|---|---|---|
| 1 | a | 35 | — | — | 100 | 7.0 | 2 | 2 | comparison |
| 2 | b | 35 | — | — | 101 | 7.1 | 2 | 2 | " |
| 3 | c | 35 | — | — | 101 | 7.8 | 2 | 2 | " |
| 4 | c | 35 | IV-4 | 100 | 102 | 7.9 | 2 | 3 | " |
| 5 | III-3 | 35 | — | — | 103 | 8.0 | 3 | 2 | " |
| 6 | III-3 | 35 | IV-4 | 100 | 131 | 16.1 | 5 | 5 | the invention |
| 7 | III-3 | 35 | IV-3 | 100 | 130 | 16.2 | 5 | 4 | " |
| 8 | III-3 | 35 | IV-8 | 100 | 132 | 17.3 | 5 | 5 | " |
| 9 | III-3 | 35 | IV-9 | 100 | 129 | 17.1 | 4 | 4 | " |
| 10 | I-10 | 35 | IV-4 | 100 | 128 | 16.0 | 4 | 4 | " |
| 11 | II-5 | 35 | IV-4 | 100 | 130 | 15.9 | 4 | 4 | " |
| 12 | II-13 | 35 | IV-4 | 100 | 125 | 18.1 | 5 | 5 | " |
| 13 | III-16 | 35 | IV-4 | 100 | 121 | 17.1 | 4 | 5 | " |
| 14 | III-20 | 35 | IV-4 | 100 | 120 | 16.1 | 4 | 5 | " |
| 15 | III-22 | 35 | IV-4 | 100 | 125 | 15.8 | 5 | 5 | " |
| 16 | — | — | — | — | 40 | 3.9 | 1 | 3 | comparison |
| 17 | III-35 | 35 | IV-4 | 100 | 135 | 17.4 | 5 | 5 | the invention |

EXAMPLE 4

Silver halide (98 mole % AgCl and 2 mol % AgBr) grains having an average size of 0.17 μm and containing rhodium in an amount of $1.0\times10^{-4}$ mole per mole of silver halide were sulfur-sensitized in the usual manner. Thereafter, 6-methyl-4-hydroxyl,3,3a, 7-tetraazaindene was added as a stabilizer. The coating solutions for the necessary layers had the following formulations. The emulsion layer was applied to give a silver deposit of 3.0 g/m$^2$.

| Recipe (1) (formulation of silver halide emulsion layer) | |
|---|---|
| Compound (S) (as used in Example 3) | 1 mg/m$^2$ |
| Sodium hydroxide | 14 mg/m$^2$ |
| Compound according to the present invention [as represented by the general formula (I), (II), (III) or (IV)] or comparative compound | (see Table 4) |
| Saponin | 120 mg/m$^2$ |
| Sodium dodecylbenzenesulfonate | 80 mg/m$^2$ |
| Butyl acrylate/styrene/acrylic acid copolymer latex | 1100 mg/m$^2$ |
| 5-Methylbenzotriazole | 10 mg/m$^2$ |
| Compound (Z) (as used in Example 3) | 10 mg/m$^2$ |
| Aqueous styrene/maleic acid copolymer | 50 mg/m$^2$ |
| Formulation of emulsion protective layer | |
| Gelatin | 1.1 g/m$^2$ |

-continued

| | |
|---|---|
| Compound (M) (as used in Example 3) | 30 mg/m$^2$ |
| Amorphous silica | 20 mg/m$^2$ |
| Compound (K) (as used in Example 3) | 120 mg/m$^2$ |
| Gallic acid | 70 mg/m$^2$ |
| Citric acid | 5 mg/m$^2$ |
| Formaldelyde | 75 mg/m$^2$ |
| Backing layer | |
| Gelatin | 2.0 g/m$^2$ |
| Dye (e) | 20 mg/m$^2$ |
| Dye (d) | 160 mg/m$^2$ |
| Dye (f) | 90 mg/m$^2$ |
| Dye (g) | 100 mg/m$^2$ |
| Butyl acrylate/styrene copolymer | 300 mg/m$^2$ |
| Saponin | 120 mg/m$^2$ |
| Backing Protective layer | |
| Same as in Example 3. | |

The samples prepared in accordance with the recipes shown above were exposed with a room-light printer (Model P-627-FM of Danippon Screen Mfg. Co., Ltd.) through an ordinary wedge. The exposed damples were developed and subsequently processed as in Example 1 and subjected to similar tests. The test results are shown in Table 4, from which one can see that sample Nos. 6–15 and 17 according to the present invention had higher sensitivity and formed more contrasty image with better quality of halftone dots and fewer black peppers than the comparative samples.

TABLE 4

| Sample No. | Hydrazide compound Identification | Hydrazide compound Amount, mg/m$^2$ | Compound formula (IV) Identification | Compound formula (IV) Amount, mg/m$^2$ | Relative sensitivity | Gamma | Quality of halftone dots | Black pepper | Remarks |
|---|---|---|---|---|---|---|---|---|---|
| 1 | a | 35 | — | — | 100 | 8.1 | 2 | 2 | comparison |
| 2 | b | 35 | — | — | 99 | 8.3 | 2 | 2 | " |
| 3 | c | 35 | — | — | 98 | 7.9 | 3 | 2 | " |
| 4 | c | 35 | IV-4 | 100 | 102 | 8.8 | 2 | 2 | " |
| 5 | III-3 | 35 | — | — | 102 | 8.5 | 3 | 3 | " |
| 6 | III-3 | 35 | IV-4 | 100 | 131 | 16.3 | 5 | 5 | the invention |
| 7 | III-3 | 35 | IV-3 | 100 | 132 | 15.9 | 5 | 5 | " |
| 8 | III-3 | 35 | IV-8 | 100 | 135 | 16.2 | 5 | 5 | " |
| 9 | III-3 | 35 | IV-9 | 100 | 129 | 16.1 | 5 | 5 | " |
| 10 | I-10 | 35 | IV-4 | 100 | 128 | 16.2 | 5 | 5 | " |
| 11 | II-5 | 35 | IV-4 | 100 | 127 | 16.3 | 4 | 5 | " |
| 12 | II-13 | 35 | IV-4 | 100 | 123 | 15.5 | 4 | 5 | " |
| 13 | III-16 | 35 | IV-4 | 100 | 128 | 15.3 | 4 | 4 | " |
| 14 | III-20 | 35 | IV-4 | 100 | 131 | 15.9 | 5 | 5 | " |
| 15 | III-22 | 35 | IV-4 | 100 | 127 | 15.7 | 5 | 5 | " |
| 16 | — | — | — | — | 30 | 5.0 | 1 | 3 | comparison |
| 17 | III-35 | 35 | IV-4 | 100 | 135 | 16.5 | 5 | 5 | the invention |

EXAMPLE 5

Using the silver halide grains described below, emulsions were prepared as in Example 1 except that compounds within the scope of the present invention or comparative compounds were added as shown in Table 5. The silver halide grains used were cubic, monodispersed silver iodobromide grains (grains A) having an average size of 0.3 μm and containing 1 mol % AgI and $10^{-7}$ mole of iridium per mole of AgI, and sulfur-sensitized cubic, monodispersed silver iodobromide grains (grains B) having an average size of 0.15 μm and containing 0.1 mol % AgI. The two types of grains were mixed at a ratio of 1:1 to prepare emulsions.

Using these emulsions, light-sensitive materials were fabricated and exposed under an iodine-filled light source (i.e., an iodine light source) having a tungsten filament. The exposed samples were developed and subsequently processed as in Example 1. The samples were then subjected to similar tests, the results of which are shown in Table 5.

TABLE 5

| Sample No. | Hydrazide compound Identification | Hydrazide compound Amount, mg/m$^2$ | Compound formula (IV) Identification | Compound formula (IV) Amount, mg/m$^2$ | Relative sensitivity | Gamma | Quality of halftone dots | Black pepper | Remarks |
|---|---|---|---|---|---|---|---|---|---|
| 1 | a | 35 | — | — | 100 | 8.7 | 2 | 2 | comparison |
| 2 | b | 35 | — | — | 99 | 9.0 | 2 | 2 | " |
| 3 | c | 35 | — | — | 102 | 9.1 | 2 | 3 | " |
| 4 | c | 35 | IV-4 | 100 | 103 | 9.2 | 2 | 2 | " |
| 5 | III-3 | 35 | — | — | 101 | 8.8 | 3 | 3 | " |
| 6 | III-3 | 35 | IV-4 | 100 | 129 | 15.9 | 5 | 5 | the invention |
| 7 | III-3 | 35 | IV-3 | 100 | 128 | 16.3 | 5 | 5 | " |
| 8 | III-3 | 35 | IV-8 | 100 | 130 | 16.1 | 5 | 5 | " |
| 9 | III-3 | 35 | IV-9 | 100 | 131 | 16.0 | 5 | 5 | " |
| 10 | I-10 | 35 | IV-4 | 100 | 132 | 15.9 | 4 | 5 | " |
| 11 | II-5 | 35 | IV-4 | 100 | 131 | 15.3 | 4 | 5 | " |
| 12 | II-13 | 35 | IV-4 | 100 | 129 | 16.1 | 4 | 5 | " |
| 13 | III-16 | 35 | IV-4 | 100 | 125 | 16.2 | 5 | 5 | " |
| 14 | III-20 | 35 | IV-4 | 100 | 133 | 16.1 | 4 | 5 | " |
| 15 | III-22 | 35 | IV-4 | 100 | 129 | 15.8 | 5 | 5 | " |
| 16 | — | — | — | — | 46 | 4.8 | 1 | 3 | comparison |
| 17 | III-35 | 35 | IV-4 | 100 | 132 | 16.8 | 5 | 5 | the invention |

As one can see from Table 5, sample Nos. 6–15 and 17 according to the present invention had higher sensitivity and formed more contrasty image with better quality of halftone dots and fewer black peppers than the comparative samples.

EXAMPLE 6

Emulsions were prepared as in Example 5 except that grains A were replaced by tabular grains (grains C), which were made from Emulsion 1 described on page 13 of JP-A-58-113926. This emulsion was a silver iodobromide emulsion having an average diameter of 2.8 μm and an average thickness of 0.095 μm, with an average aspect ratio being 29.5:1. Grains B used in Example 5 and grains C were mixed at a ratio of 5:1. Using the resulting mixture, light-sensitive materials were fabricated as in Example 4 except that compounds within the scope of the present invention or comparative compounds were used as shown in Table 6. The samples were exposed, developed and subsequently processed. Thereafter, the samples were subjected to a halftone dot quality test and the test results are shown in Table 6, from which one can see that sample Nos. 6–15 and 17 according to the present invention and higher sensitivity and formed more contrasty image with better quality of halftone dots and fewer black peppers. It was therefore clear that the compounds within the scope of the present invention produced satisfactory results even when tabular silver halide grains were used instead of cubic grains.

TABLE 6

| Sample No. | Hydrazide compound Identification | Hydrazide compound Amount, mg/m² | Compound formula (IV) Identification | Compound formula (IV) Amount, mg/m² | Relative sensitivity | Gamma | Quality of halftone dots | Black pepper | Remarks |
|---|---|---|---|---|---|---|---|---|---|
| 1 | a | 35 | — | — | 100 | 9.3 | 2 | 3 | comparison |
| 2 | b | 35 | — | — | 102 | 8.9 | 3 | 2 | " |
| 3 | c | 35 | — | — | 98 | 8.5 | 2 | 2 | " |
| 4 | c | 35 | IV-4 | 100 | 99 | 9.1 | 3 | 2 | " |
| 5 | III-3 | 35 | — | — | 101 | 9.2 | 3 | 3 | " |
| 6 | III-3 | 35 | IV-4 | 100 | 133 | 15.9 | 5 | 4 | the invention |
| 7 | III-3 | 35 | IV-3 | 100 | 132 | 15.3 | 5 | 5 | " |
| 8 | III-3 | 35 | IV-8 | 100 | 135 | 13.3 | 5 | 5 | " |
| 9 | III-3 | 35 | IV-9 | 100 | 131 | 14.8 | 5 | 5 | " |
| 10 | I-10 | 35 | IV-4 | 100 | 129 | 16.1 | 5 | 5 | " |
| 11 | II-5 | 35 | IV-4 | 100 | 128 | 16.2 | 4 | 5 | " |
| 12 | II-13 | 35 | IV-4 | 100 | 130 | 15.5 | 5 | 4 | " |
| 13 | III-16 | 35 | IV-4 | 100 | 131 | 15.3 | 4 | 4 | " |
| 14 | III-20 | 35 | IV-4 | 100 | 132 | 14.9 | 4 | 4 | " |
| 15 | III-22 | 35 | IV-4 | 100 | 131 | 14.8 | 5 | 5 | " |
| 16 | — | — | — | — | 45 | 4.3 | 1 | 3 | comparison |
| 17 | III-35 | 35 | IV-4 | 100 | 136 | 16.3 | 5 | 5 | the invention |

EXAMPLE 7

Emulsions were prepared as in Example 1. The composition of the silver halide emulsion layer used in this example was the same as what was employed in Example 1 except that the cyanine dye and spectral sensitizer were replaced by the following dye and compound, respectively, with each being added in an amount of 1 mg/m²:

Dye:

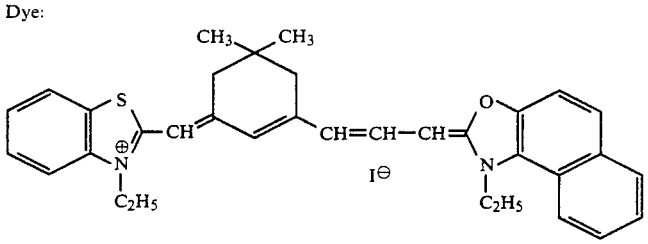

Compound:

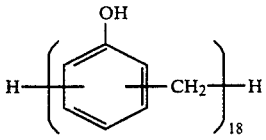

Formulation of emulsion protective layer

Same as in Example 1.

Formulation of backing layer

| | |
|---|---|
| Gelatin | 3 g/m² |
| Dye (d) | 80 mg/m² |
| Dye (e) | 40 mg/m² |
| Dye | 100 mg/m² |

-continued

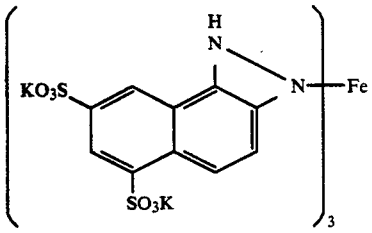

| | |
|---|---|
| Saponin | 130 mg/m$^2$ |
| Latex polymer (butyl acrylate/styrene copolymer) | 150 mg/m$^2$ |
| Glyoxal | 10 mg/m$^2$ |
| Formulation of backing protective layer | |
| Same as in Example 1. | |

The samples of light-sensitive material prepared were exposed for $10^{-5}$ second with an apparatus using as a light source an infrared semiconductor laser emitting light having a main peak at 780 nm. The exposed samples were developed and subsequently processed as in Example 1. The processed samples were subjected to similar tests and the test results are shown in Table 7.

With the samples thus prepared, the same results as in Example 1 were obtained.

As will be understood from the foregoing description and data, the present invention provides a silver halide photographic material that has high sensitivity and forms a contrasty image with good quality of halftone dots and few black peppers.

TABLE 7

| Sample No. | Hydrazide compound Identification | Hydrazide compound Amount, mg/m$^2$ | Compound formula (IV) Identification | Compound formula (IV) Amount, mg/m$^2$ | Relative sensitivity | Gamma | Quality of halftone dots | Black pepper | Remarks |
|---|---|---|---|---|---|---|---|---|---|
| 1 | a | 35 | — | — | 100 | 7.7 | 3 | 2 | comparison |
| 2 | b | 35 | — | — | 101 | 7.3 | 2 | 3 | " |
| 3 | c | 35 | — | — | 88 | 8.1 | 2 | 2 | " |
| 4 | c | 35 | IV-4 | 100 | 99 | 7.7 | 2 | 2 | " |
| 5 | III-3 | 35 | — | — | 98 | 8.9 | 3 | 3 | " |
| 6 | III-3 | 35 | IV-4 | 100 | 136 | 16.6 | 5 | 5 | the invention |
| 7 | III-3 | 35 | IV-3 | 100 | 132 | 16.3 | 5 | 5 | " |
| 8 | III-3 | 35 | IV-8 | 100 | 131 | 16.1 | 5 | 5 | " |
| 9 | III-3 | 35 | IV-9 | 100 | 133 | 16.4 | 5 | 5 | " |
| 10 | I-10 | 35 | IV-4 | 100 | 130 | 16.3 | 5 | 5 | " |
| 11 | II-5 | 35 | IV-4 | 100 | 133 | 15.8 | 4 | 5 | " |
| 12 | II-13 | 35 | IV-4 | 100 | 129 | 16.1 | 5 | 5 | " |
| 13 | III-16 | 35 | IV-4 | 100 | 128 | 15.9 | 5 | 4 | " |
| 14 | III-20 | 35 | IV-4 | 100 | 133 | 16.3 | 5 | 5 | " |
| 15 | III-22 | 35 | IV-4 | 100 | 130 | 16.2 | 5 | 5 | " |
| 16 | — | — | — | — | 40 | 4.9 | 1 | 3 | comparison |
| 17 | III-35 | 35 | IV-4 | 100 | 135 | 16.9 | 5 | 5 | the invention |

As one can see from Table 7, sample Nos. 6–15 and 17 according to the present invention had higher sensitivity and formed image with better quality of dots and fewer black peppers.

EXAMPLE 8

A total of 17 samples were prepared in the same manner as in Example 1 except that the hardener in Recipe (2) was replaced by a hardener which is a combination of compound and formalin as a mentioned below:

| | |
|---|---|
| 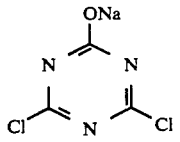 | 60 mg/m$^2$ |
| Formalin | 30 mg/m$^2$ |

What is claimed is:

1. In a silver halide photographic material having at least one light-sensitive silver halide emulsion layer, the improvement wherein said photographic material contains at least one of the compounds represented by the formula IIIa shown below and at least one compound represented by the formula IV also shown below:

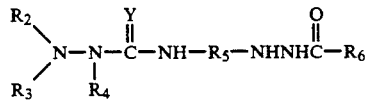

(IIIa)

where $R_2$, $R_3$ and $R_4$ each represents a hydrogen atom, an optionally substituted aliphatic, aromatic, heterocyclic, alkoxy or aryloxy group; $R_5$ represents a divalent aromatic group; $R_6$ represents an optionally substituted alkyl, alkoxy or amino group; and Y represents a sulfur or oxygen atom;

$$R_1-O\text{-}(CH_2CH_2O)_nH \quad \text{(IV)}$$

where $R_1$ is a hydrogen atom or a substituted or unsubstituted aromatic group; and n is an integer of 10–200; and wherein said photographic material contains a hardener.

2. A silver halide photographic material according to claim 1 wherein the compound represented by the formula (IV) is at least one compound selected from among the following compounds IV-3, IV-9 and IV-10.

$$HO(CH_2CH_2O)_nH \quad n = 50 \quad \text{IV-3}$$

-continued

IV-9

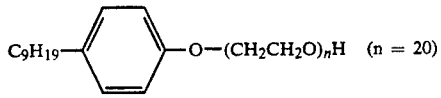

IV-10

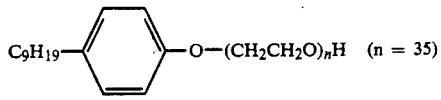

3. A silver halide photographic material according to claim 1 wherein the silver halide contained in the silver halide emulsion layer is silver bromide or silver iodobromide.

4. A silver halide photographic material according to claim 1 wherein the silver halide contained in the silver halide emulsion layer is composed of grains having an average size of 0.1–1.0 μm, with at least 75% of the total grains having a grain size ranging from 0.7 to 1.3 times the average grain size.

* * * * *